United States Patent
McCool et al.

(10) Patent No.: US 7,096,235 B2
(45) Date of Patent: Aug. 22, 2006

(54) COMPUTER IMPLEMENTED COMPACT 0-COMPLETE TREE DYNAMIC STORAGE STRUCTURE AND METHOD OF PROCESSING STORED DATA

(75) Inventors: Michael McCool, Pasadena, CA (US); Linda Ann Wald, Los Angeles, CA (US)

(73) Assignee: Sand Technology Systems International, Inc., Quebec (CA)

( * ) Notice: Subject to any disclaimer, the term of this patent is extended or adjusted under 35 U.S.C. 154(b) by 445 days.

(21) Appl. No.: 10/401,303

(22) Filed: Mar. 27, 2003

(65) Prior Publication Data

US 2004/0193632 A1 Sep. 30, 2004

(51) Int. Cl.
*G06F 17/30* (2006.01)

(52) U.S. Cl. .......................... 707/201; 707/100; 707/3; 707/7

(58) Field of Classification Search ................ 707/201, 707/1–10, 100, 104.1
See application file for complete search history.

(56) References Cited

U.S. PATENT DOCUMENTS

| | | | | |
|---|---|---|---|---|
| 5,640,551 A | * | 6/1997 | Chu et al. ...................... 707/5 |
| 5,787,430 A | * | 7/1998 | Doeringer et al. ........... 707/100 |
| 5,930,805 A | * | 7/1999 | Marquis ...................... 707/201 |
| 2002/0052869 A1 | * | 5/2002 | O'Keeffe et al. .............. 707/2 |

OTHER PUBLICATIONS

PCT/US04/08923 Search Report, Dated Sep. 20, 2004, 3 pages.

PCT/US04/08923 Written Opinion, Dated Oct. 12, 2004, 5 pages.

* cited by examiner

*Primary Examiner*—Alford Kindred
*Assistant Examiner*—CamLinh Nguyen
(74) *Attorney, Agent, or Firm*—Christie, Parker & Hale, LLP

(57) ABSTRACT

A method and apparatus for storage, insertion, deletion, and searching of a database index using a compact representation of a 0-complete binary tree. The compact representation, termed a $C_0$-trie, is represented in a computer memory as a set of layered vectors with the layering of the vectors corresponding to the depths of the $C_0$-trie. Insertion and deletion processes maintain the representation of the $C_0$-trie remains in a well-formed and taut state at the end of each operation, thus providing subsequent efficient manipulations of the $C_0$-trie in computer memory.

24 Claims, 18 Drawing Sheets

COMPLETE BINARY TREE

0-COMPLETE BINARY TREE

```
if (dummies needed at this level) ———1700
1701——current_minimum = last depth in temporary_depths vector
1702——for( subtrie = current_LID's subtrie - 1; subtrie > previous_LID's subtrie; --
       subtrie)
    1704——If (subtrie's position > previous_position)
        1706———If (depth of subtrie < current_minimum)
            1708———put a dummy of subtrie's depth at the end of temporary_depths
                    vector
            1710———current_minimum = subtrie's depth.
        else
            stop——1712
```

FIG. 17

COMPUTER IMPLEMENTED COMPACT 0-COMPLETE TREE DYNAMIC STORAGE STRUCTURE AND METHOD OF PROCESSING STORED DATA

BACKGROUND OF THE INVENTION

The invention relates to computer data and file storage systems, and more particularly to a method and system for inserting and deleting search keys from a structure implementing a compact representation of a 0-complete binary tree.

Data and file storage systems such as a database, in particular those implemented in computer systems, provide for the storage and retrieval of specific items of information stored in the database. The information stored in the database is generally indexed such that any specific item of information in the database may be located using search keys. Searches are generally accomplished by using search keys to search through an index to find pointers to the most likely locations of the information in the database, whether that location is within the memory of the computer system or in a storage medium of the computer system.

An index to database records within a computer is sometimes structured as a "trie" comprised of one or more nodes, connected hierarchically, stored within a storage means of the computer. A trie is a tree structure designed for storing strings in which there is one node for every common prefix. The actual strings are stored at the "bottom" of this hierarchical structure in leaf nodes. Each node generally includes one or more branch fields containing information for directing a search, and each such branch field usually contains a pointer, or branch, to another node, and an associated branch key indicating ranges or types of information that may be located along that branch from the node. The trie, and any search of the trie, begins at a single node referred to as the root node and progresses downwards through the various branch nodes until the nodes containing either the items of information or, more usually, pointers to items of information are reached. The information related nodes are often referred to as leaf nodes or, since this is the level at which the search either succeeds or fails, failure nodes. Within a tree storage structure of a computer, any node within a trie is a parent node with respect to all nodes dependent from that node, and sub-structures within a trie which are dependent from that parent node are often referred to as subtries with respect to that node.

The decision as to which direction, or branch, to take through a tree storage structure in a search is determined by comparing the search key and the branch keys stored in each node encountered in the search. The results of the comparisons to the branches descending from a given node are to be followed in the next step of the search. In this regard, search keys are most generally comprised of strings of characters or numbers which relate to the item or items of information to be searched for within the computer system.

The prior art contains a variety of search tree data storage structures for computer database systems, among which is the apparent ancestor from which all later tree structures have been developed and the most general form of search tree well known in the art, the "B-tree." See, for example, Knuth, *The Art of Computer Programming*, Vol. 3, pp. 473–479. A B-tree provides both primary access and then secondary access to a data set. Therefore, these trees have often been used in data storage structures utilized by database and file systems. Nevertheless, there are problems that exist with the utilization of B-tree storage structures within database systems. Every indexed attribute value must be replicated in the index itself. The cumulative effect of replicating many secondary index values is to create indices which often exceed the size of the database itself. This overhead can force database designers to reject potentially useful access paths. Moreover, inclusion of search key values within blocks of the B-tree significantly decreases the block fan out and increases tree depth and retrieval time.

Another tree structure which can be implemented in computer database systems, compact 0-complete binary trees (i.e., O-trees), eliminates search values from indices by replacing them with small surrogates whose typical 8-bit length will be adequate for most practical key lengths (i.e., less than 32 bytes). Thus, actual values can be stored anywhere in arbitrary order, leaving the indices to the tree structure to be just hierarchical collections of (surrogate, pointer) pairs stored in an index block. This organization can reduce the size of the indexes by about 50% to 80% and increases the branching factor of the trees, which provides a reduction in the number of disk accesses in the system per exact match query within computer database systems. See Orlandic and Pfaltz, *Compact 0-Complete Trees, Proceedings of the 14th VLDB Conference*, pp. 372–381.

While the known method of creating $C_0$-trees increases storage utilization 50% to 80% over B-trees, there still remains a waste of storage space because of the presence of dummy entries (surrogate, pointer==NIL) wherein the number of index entries at the lowest level of the tree exceeds the actual number of records stored. Therefore, the expected storage utilization of index entries of $C_0$-trees at the lowest tree level is 0.567 versus 0.693 as in the case of B-trees. See Orlandic and Pfaltz, *Compact 0-Complete Trees, Proceedings of the 14th VLDB Conference*, pp. 372–381.

Moreover, although B-trees and O-tree storage structures represent efficient methods of searching for values, both methods require initial generation and subsequent maintenance of the tree data storage structure itself. Neither of these computer storage structures inherently stores information in sorted order.

A trie can be built more efficiently if the key records are initially sorted in the order of their key field, than if records are in random order. Therefore, an efficient computer database system should sort sets of keys first, and then build a trie based on keys extracted at intervals from the sorted keys. Searches of the tree data storage structure will also be performed more efficiently if the trie does not contain an excess number of keys, namely keys that are associated with data no longer in the database or keys that are no longer necessary to maintain the structure of the trie. In some implementations of O-tree storage structures, the method of storing and indexing the search keys may be complex, and the method of inserting and deleting groups of keys may be inefficient. Therefore, a need exists to simplify the trie structure and to easily delete and insert groups of keys in batches is desirable, especially when large groups of keys are involved.

SUMMARY OF THE INVENTION

A method and apparatus for storage, insertion, deletion, and searching of a database index using an O-tree is provided. The O-tree is represented in a computer memory as a set of layered vectors with the layering of the vectors corresponding to the depths of the O-tree. This representation of the O-tree is termed a "$C_0$-trie." Insertion and deletion processes maintain the $C_0$-trie in a well-formed and taut state at the end of each operation, thus providing subsequent efficient manipulations of the $C_0$-trie in computer memory.

In one aspect of the invention, a $C_0$-trie, includes a depth vector having encoded depth values for depths of leaves of an O-tree. The depth vector is encoded to show whether or not the corresponding leaf is an empty leaf node and is of arbitrary length. A set of selector vectors, grouped in a compound vector, corresponds to the levels of the $C_0$-trie. Each selector vector is a vector used to select entries of the depth vector. As with the length of the depth vector, the number of selector vectors in the set of selector vectors is arbitrary. Each selector vector is paired with a counter vector from a set of counter vectors grouped in a compound vector. The counter vector is a vector whose length is equal to the number of 1-bits in the corresponding selector vector.

Values in the $C_0$-trie can be referred to by their position within the tree. This position identifier is a surrogate for the value that can be efficiently encoded in a bit vector. Since the $C_0$-trie organizes values in lexical order, the position identifier is a lexical identifier.

In another aspect of the invention, for any level l subtrie A of the $C_0$-trie, and its level l predecessor B, the depths of all the level l-1 subtries of A are greater than the depths of A and B (called well-formed), and values or strings in the $C_0$-trie are distinguished by the shortest possible prefixes by having no unnecessary empty nodes included in the leaves of the subtries (called taut).

In another aspect of the invention, a search process is provided for the computer implemented $C_0$-trie. The search process includes searching depths of the top-1 search level subtries for each subtrie in a next level beneath a top search level. The depth values selected by the top-1 search level selector vector are examined and if the value is not identified as being part of the current top-1 search level subtrie, the search process determines if there are any remaining top-1 level subtries to search. If there are not any remaining top-1 level subtries to search, the search process terminates. If there are more top-1 level subtries to search, the search process continues searching the remaining top-1 level subtries. When the search process identifies a top-1 search level subtrie including the searched for value, the search process descends one level by making the current top-1 search level the top search level and the identified top-1 search level subtrie an identified top search level subtrie. Finally, the search process determines if a new top search level is a leaf selector level and if not, continues searching the top-1 search level subtries of the identified top search level subtrie.

In another aspect of the invention, a delete process is provided for the computer implemented $C_0$-trie. The delete process receives a list of lexical identifiers or tokens to delete. If the number of lexical identifiers to be deleted exceeds a threshold value, the delete process generates a new $C_0$-trie using lexical identifiers remaining in the $C_0$-trie. If the number of lexical identifiers to be deleted does not exceed the threshold value, the delete process deletes leaves in the $C_0$-trie including the lexical identifiers. Otherwise, the delete process traverses a branch of the $C_0$-trie including a lexical identifier to be deleted and deletes the lexical identifier from the branch of the $C_0$-trie. If the remaining $C_0$-trie has more than two levels, then the delete process examines the $C_0$-trie and merges subtries of the $C_0$-trie.

In another aspect of the invention, an insert process for the computer implemented $C_0$-trie includes receiving values to insert and determining if the $C_0$-trie has two levels. If so, then while there are values to insert, the insert process identifies a key interval in an existing leaf of the $C_0$-trie to which a value belongs and inserts one or more values into the identified key interval. Once the insert process has completed inserting values, the insert process splits a subtrie of the $C_0$-trie if the subtrie includes new values that have a depth less than or equal to the depth of the subtrie.

In another aspect of the invention, the insert process further includes the ability to process a $C_0$-trie having more than two levels. While there are values to insert, the insert process traverses a branch of the $C_0$-trie by iteratively performing the following: while a selected level immediately below the current level is not the level above a leaf level, the insert process recursively determines which level immediately below the current level includes a subtrie of the $C_0$-trie whose key interval includes a value and select as the determined subtrie. Once the insert process traverses the branch of the $C_0$-trie, the insert process identifies a key interval in an existing leaf to which a value belongs and inserts one or more values into the identified key interval. The insert process then splits the subtrie if the subtrie includes new values that have a depth less than or equal to the depth of the subtree. After all values have been inserted, the insert process examines the $C_0$-trie for further splitting.

BRIEF DESCRIPTION OF THE DRAWINGS

These and other features, aspects, and advantages of the present invention will become better understood with regard to the following description, appended claims, and accompanying drawings where:

FIG. 17 is a process flow diagram of a dummy placement process as used by a $C_0$-trie rebuilding process in accordance with an exemplary embodiment of the present invention.

DETAILED DESCRIPTION

Figure 1A:
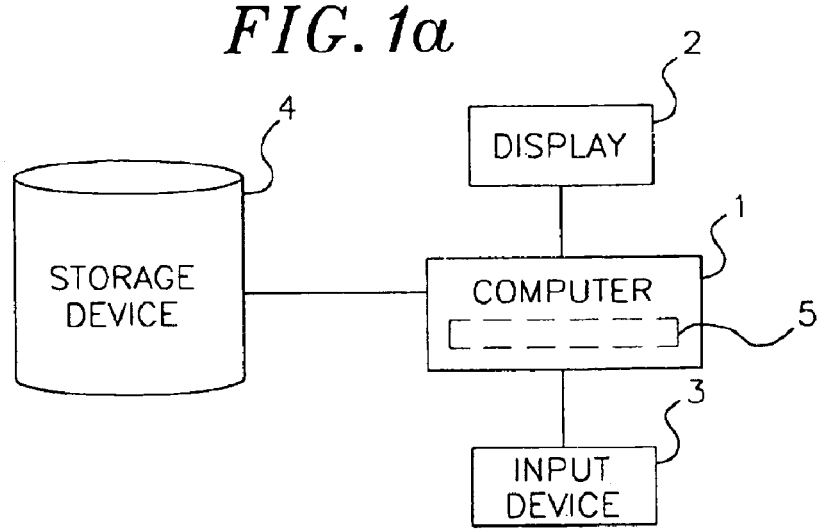
FIG. 1a is a block diagram of a data processing system in accordance with an exemplary embodiment of the present invention.

FIG. 1a depicts a data processing system having a programmable computer and computer programs for creating a file system and for processing operations on the file system in accordance with an exemplary embodiment of the present invention. The computer system includes programmable computer 1 having a processor and a memory, display 2, computer input device 3, and a storage means. The storage means includes a storage device 4 such as a magnetic disk storage system or a partition of the memory of the computer for storage of data. Hardware/and software including the file system and hardware/and software including program instructions executable by the processor for performing processing operations to be described are implemented in a file system 5 (shown in phantom lines), of computer 1. File system 5 of computer 1 coordinates the various activities related to representing data in the file system and to performing operations on one or more data files stored within the storage device 4. Computer 1 can be a programmed general purpose computer, such as a personal, mini or mainframe computer, or a special purpose computer formed by one or more integrated chips.

Figure 1B:
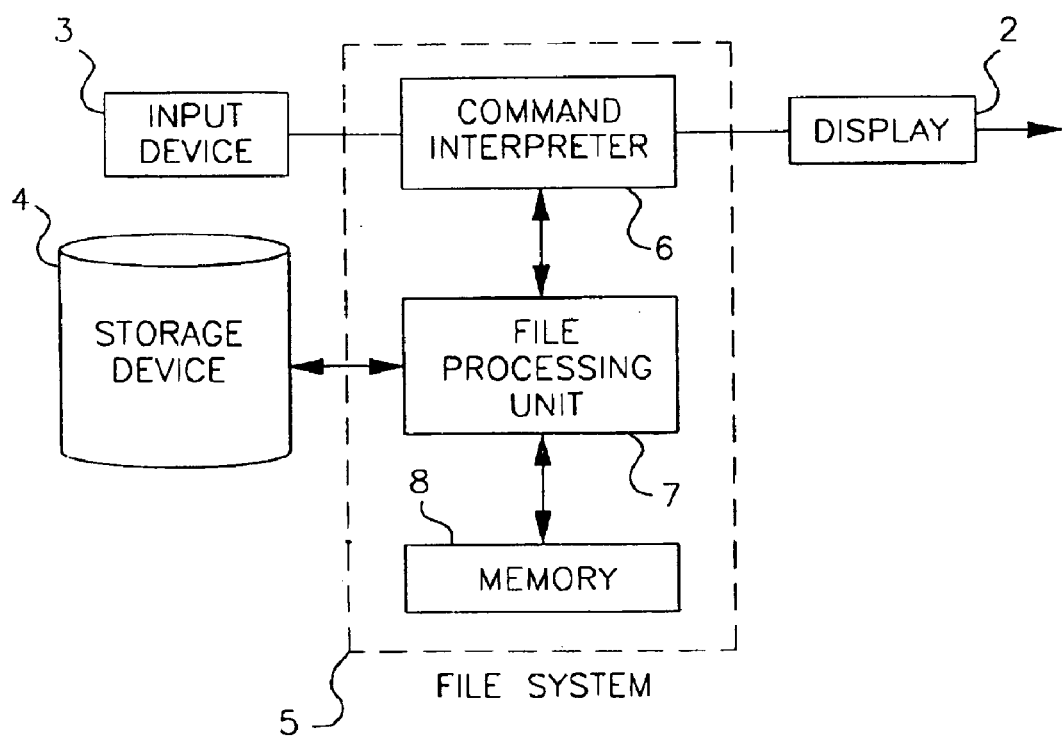
FIG. 1b is a schematic and block diagram of a database system in accordance with an exemplary embodiment of the present invention.
Figure 4A:
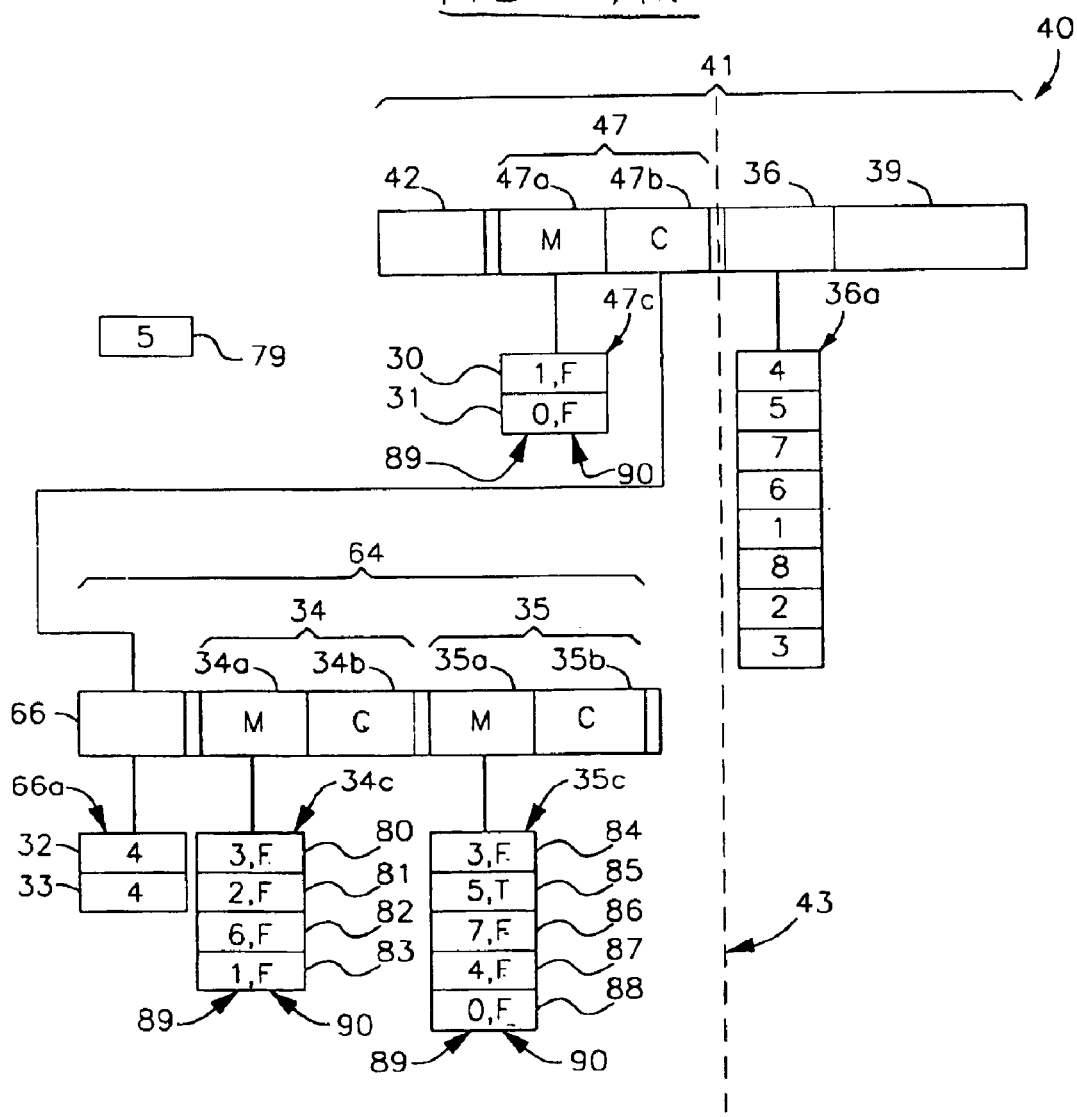
FIG. 4a illustrates an instantiation of a O-tree.

Referring to FIG. 1b, file system 5 includes a file processing unit 7 and a command interpreter 6. In order to access specific items of information stored in the computer file system, the file processing unit 7 uses a compact 0-complete data storage structure 40 as depicted in FIG. 4a for minimizing the amount of information required to retrieve items of data stored within the storage device 4. The data storage structure has a plurality of entries 30, 31, 80, 81, 82, 83, 84, 85, 86, 87, 88 for indexing search keys 1420, wherein each entry comprises a depth value 89 and a data present indicator 90, the latter, by way of example having two conditions, and a novel $C_0$-trie structure 43 stored in the storage device 4 of the computer interconnecting the entries and forming the data storage structure 40. The data storage structure 40 further includes a means 66 for storing the count of the non-NIL leaf entries associated with a search key interval range. In addition, there are separate pointers structure comprised of header 36 and entries 36a, that is distinct from the trie structure 43 and, in a typical embodiment, may be distinct from the data storage structure 40 itself. The pointers structure 36 and 36a accesses the data items within the storage container 39 of the storage device 4.

Figure 2A:
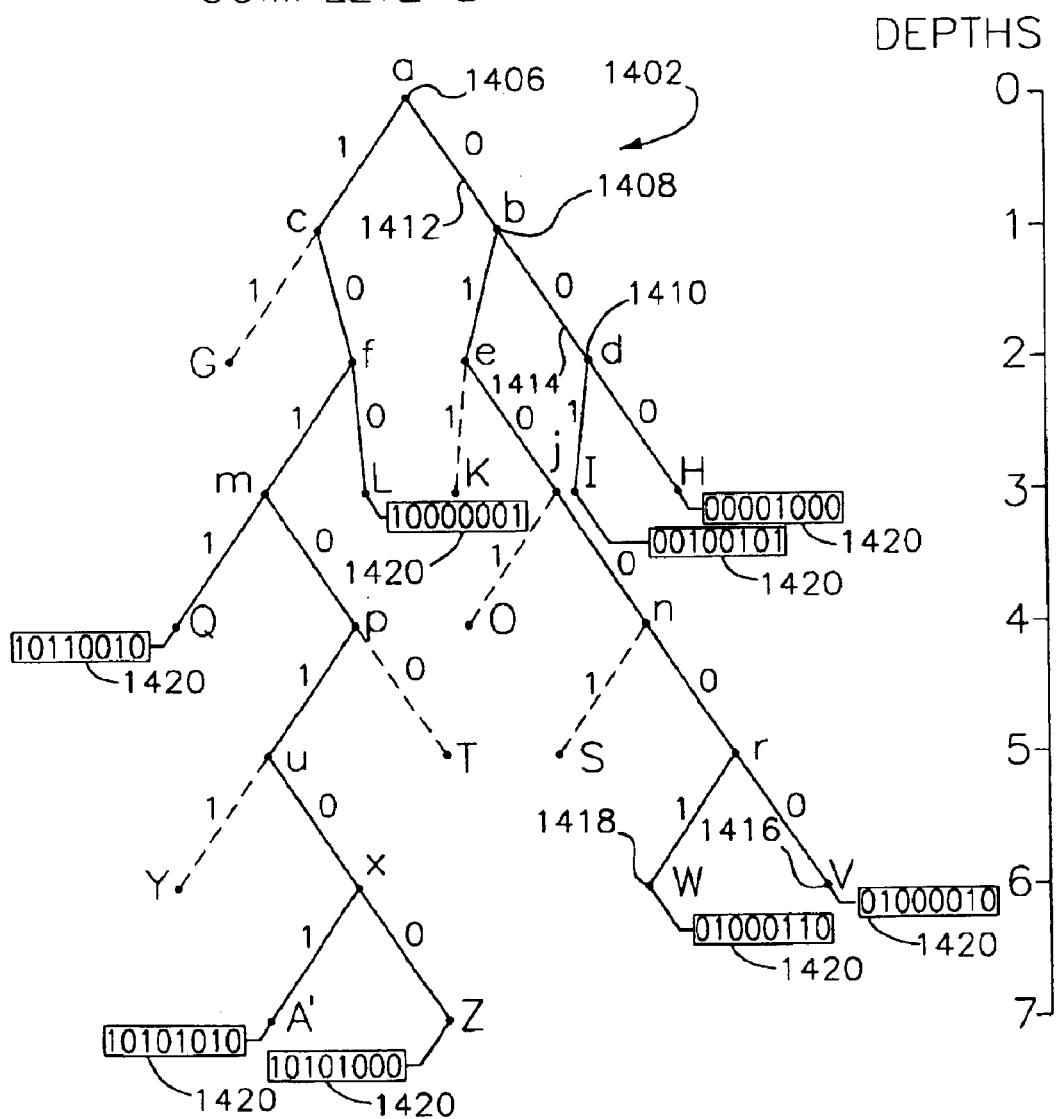
FIG. 2a is a conceptual illustration of a complete binary tree.

Referring to FIG. 2a, binary tree 1402 is an illustrative edge labeled tree data storage structure consisting of nodes indicated by dots, such as 1406, 1408 and 1410, separated by arcs or edges, such as 1412 and 1414. The nodes are identified by small and capital letters a through Z and A'. The end nodes are called leaf nodes or leafs and are labeled with capital letters. All the other interior nodes are labeled with small letters. Information to be retrieved is stored in storage locations pointed to by pointers located at the tree's leaves, such as leaves 1416 and 1418. Search keys 1420 are shown for leaves H, I, V, W, L, Z, A' and Q. In FIG. 2a, the search keys 1420 are strings of binary digits with an arbitrary, uniform length up to some maximum length in bits, 8 bits being used by way of example. The search keys 1420 associated with each of these leaves are used to locate the pointer to the storage location for the corresponding leaf in the storage device 4. Only those leaves indicated by an associated search key 1420 have a pointer to a storage location that stores associated data records and therefore are said to be full. The leaves G, K, O, S, T and Y do not have pointers to a storage location and therefore are said to be empty.

Retrieval of the data records in the storage device 4 is achieved by successively comparing binary 0 and 1 symbols in one of the search keys 1420 with a 0 or 1 edge label on each arc 1412 between the nodes along a path of the connected dots and arcs starting with root node a and ending with the desired leaf. Each node or leaf of the binary tree is either a 0-node or 0-leaf if its entering arc is labeled 0, or a 1-node or 1-leaf if its entering arc is labeled 1. In a computer database and file management system, an access path to a node is a binary string obtained by concatenating the 0 and 1 edge labels traversed from the root node a to the particular node in question.

Binary tree structures are said to be "complete" if every node is either a leaf or is a node that has exactly two non-empty direct descendants (i.e., nodes having a dependent 0-node and a dependent 1-node). In FIG. 2a, each node from node a to node A' satisfies the two conditions for completeness.

Thus, FIG. 2a depicts a tree storage structure with the search keys 1420, including 00001000, 00100101, 01000010, 01000110, 1000001, 10101000, 10101010 and 10110010, to locate data records at leaves H, I, V, W, L, Z, A' and Q respectively. Empty leaves G, K, O, T, S and Y are included within the tree 1402 to fulfill the requirement of a "complete" binary tree.

Figure 2B:
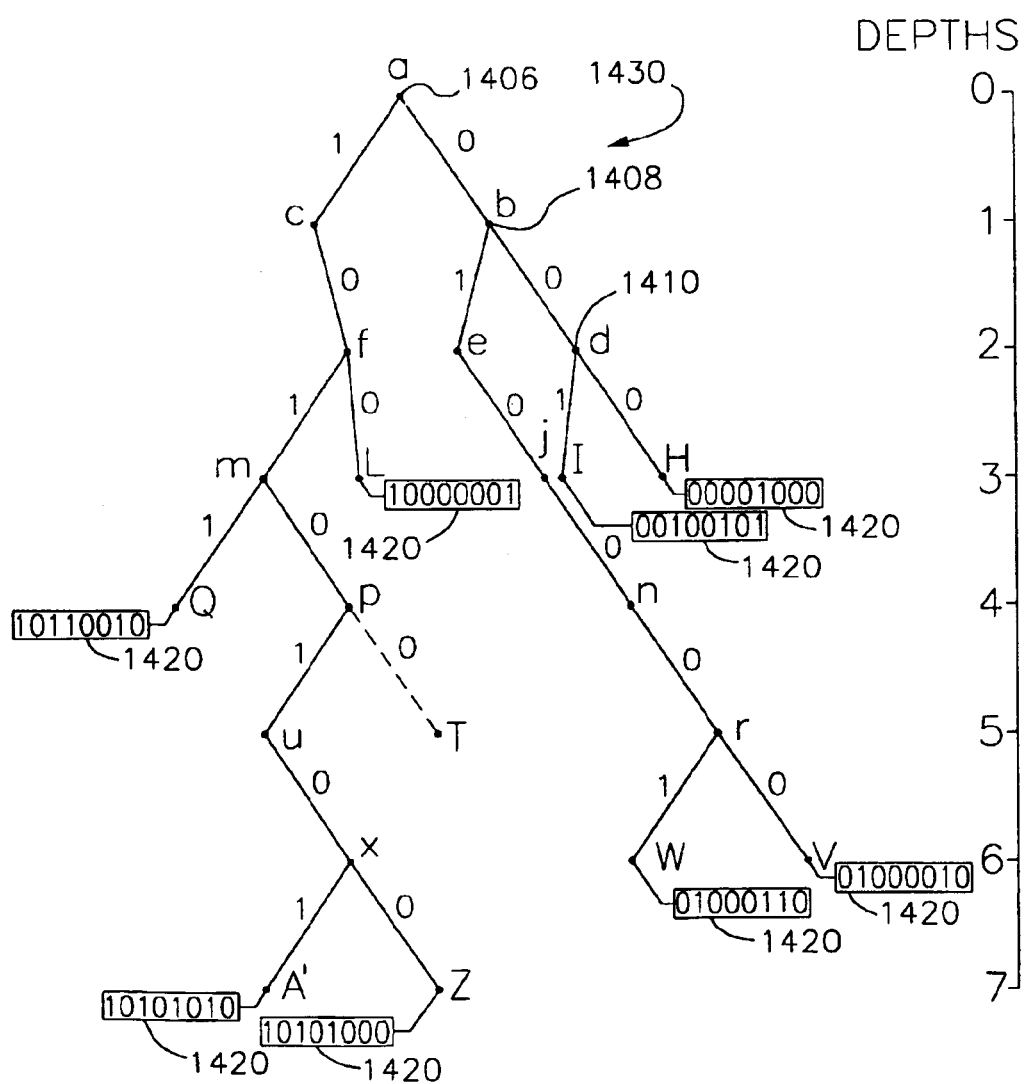
FIG. 2b is a conceptual illustration of a 0-complete binary tree.

Refer now to FIG. 2b. A prior art 0-complete binary tree 1430 is shown having the same structure, nomenclature and reference numerals as used in FIG. 2a except where noted. Binary tree 1430 with δ leaves is said to be 0-complete if 1) the sibling of any 0-leaf is present in the tree, and 2) there are exactly δ-1 1-nodes in the tree. Thus, FIG. 2b is a 0-complete binary tree representation of the binary tree of FIG. 2a since every 0-leaf H, V, L, T, Z has a sibling 1-node, and there are nine leaves H, I, V, W, L, T, Z, A' and Q and eight 1-nodes I, W, e, c, m, A', U and Q. The 0-complete binary tree 1430 is derived from the binary tree 1402 of FIG. 2a by deleting from the tree 1402 those 1-leaves that are empty (indicated by the lack of an associated search key) such as leaves G, K, O, S and Y. Note that deletion of any empty 0-leaf violates the second condition which requires eight 1-nodes in tree 1430, so that node T, even though it is empty, remains in the tree storage structure 1430 and increases required storage space.

Each interior node, designated by small letters, has a corresponding 0-subtree and 1-subtree. The "pre-order traversal" of an 0-complete binary tree starts at the root node a of the tree and then iterates the following two steps until the last node has been accessed:

(1) if the current node $nn_i$ is an internal node then the next node $nn_{i+1}$ in the order will be its 0-son because, by definition of 0-completeness, every interior node must have a 0-son node;

(2) if the current node $nn_i$ is a leaf then the next node in the pre-order will be the 1-son of the node pp whose 0-subtrie contains nni and whose depth is maximal.

Thus, the first node in pre-order is the internal root node a. The next node is its 0-son node b, which is followed by 0-son nodes d and then leaf H. The next node in pre-order is the 1-son of the node d since H is a leaf node and the 0-subtrie of node d contains H and its depth in the tree is maximal (i.e., depth of 2 as opposed to node b whose 0-subtrie contains H and whose depth is 1). The complete pre-order traversal of tree 1430 depicted in FIG. 2b is the sequence a b d H I e j n r V W c f L m p T u x Z A' Q.

Successor nodes to each leaf node H, I, V, W, L, T, Z, A' except the last leaf node Q in the pre-order traversal of a 0-complete binary tree are also of special importance. These nodes, termed bounding nodes, are respectively I, e, W, c, m, u, A', Q in FIG. 2b. Since bounding nodes are defined in terms of the pre-order traversal, each leaf node, except the last one Q, has its own unique bounding node. In addition, from the previously stated definition of the pre-order traversal, every bounding node is a 1-node. "Discriminators" of a node and a bounding node can be used to establish a key interval that corresponds to each leaf in the 0-complete binary tree. The "discriminator" of a leaf node is a binary string of the same length as the search keys and whose high order, or left-most, bits are the binary bits of the concatenated arcs, or path, leading up to the leaf with all of the other right-most bits set to 0.

The "key interval" is formally defined to be the key range between the leaf discriminator (inclusively) and the discriminator of its bounding node (non-inclusively). The exception is again the last leaf (Q by way of example) in the pre-order traversal, whose upper bound of its key interval is always known in advance and consists of all one bits (i.e., 11111111).

In Table 1 below, the key intervals of each leaf node H, I, V, W, L, T, Z, A', Q of the 0-complete binary tree 1430 are listed in lexicographic order. Thus, for example, leaf V has a discriminator of 01000000 and its corresponding bounding node W has a discriminator 01000100; the key interval of leaf V, as shown in Table 1, is 01000000 (inclusive) to 01000100 (non-inclusive), or 01000000 to 01000011 inclusively.

TABLE 1

| Leaf | Key Interval of Leaf Node | Bounding Node Node - Depth |
|---|---|---|
| H | 00000000–00100000 | I - 3 |
| I | 00100000–01000000 | e - 2 |
| V | 01000000–01000100 | W - 6 |
| W | 01000100–10000000 | c - 1 |
| L | 10000000–10100000 | m - 3 |
| T | 10100000–10101000 | u - 5 |
| Z | 10101000–10101010 | A' - 7 |
| A' | 10101010–10110000 | Q - 4 |
| Q | 10110000–11111111 | -0 |

By examining Table 1, knowledge of bounding node discriminators is sufficient to identify the appropriate key interval of any leaf and hence the corresponding data record with any given search key. By way of example using search key 01000010, a search procedure that examines the bounding discriminators of the tree in their pre-order traversal sequence will find the correct key interval for the search key when the first bounding discriminator greater than the search key 01000010 is found. The discriminator of the first bounding node I, 00100000, is less than the search key 01000010. The second bounding discriminator of bounding node e in pre-order, 01000000, is also less than the search key. The discriminator of the third bounding node W, 01000100, is greater and is the non-inclusive upper bound of the key interval for leaf V. The inclusive lower bound of the key interval for leaf V is the discriminator of the previous bounding node e.

Along with each key interval in Table 1, there is shown a number denoting the "depth" of the bounding node in the 0-complete binary tree 1430 for that key interval. For example, the bounding node of leaf V is the leaf W that has a depth of 6 in the 0-complete binary tree. For the last node Q, which has no bounding node by definition, the upper bound of its interval is set to 11111111 with an assigned depth of 0.

There is one apparent regularity in the relationship between discriminators of a set of bounding nodes and their depths. If the depth of a bounding node is dd, then by definition of a discriminator, the $dd^{th}$ bit of the corresponding discriminator is set to 1 with all subsequent lower order bits 0.

In Table 1 wherein the key length is eight bits, the initial dummy discriminator is 00000000 and the depth of the first bounding node I is three, the third bit of the first bounding node discriminator is 1 and all subsequent, low order bits are 0 to obtain the first bounding node discriminator 00100000; the depth of the second bounding node e is two, using the first bounding node discriminator, the second bit is set to 1 and all subsequent bits are set to 0 in order to obtain the second bounding node discriminator 01000000. The discriminators of the remainder of the bounding nodes are constructed in a similar manner.

Figure 3A:
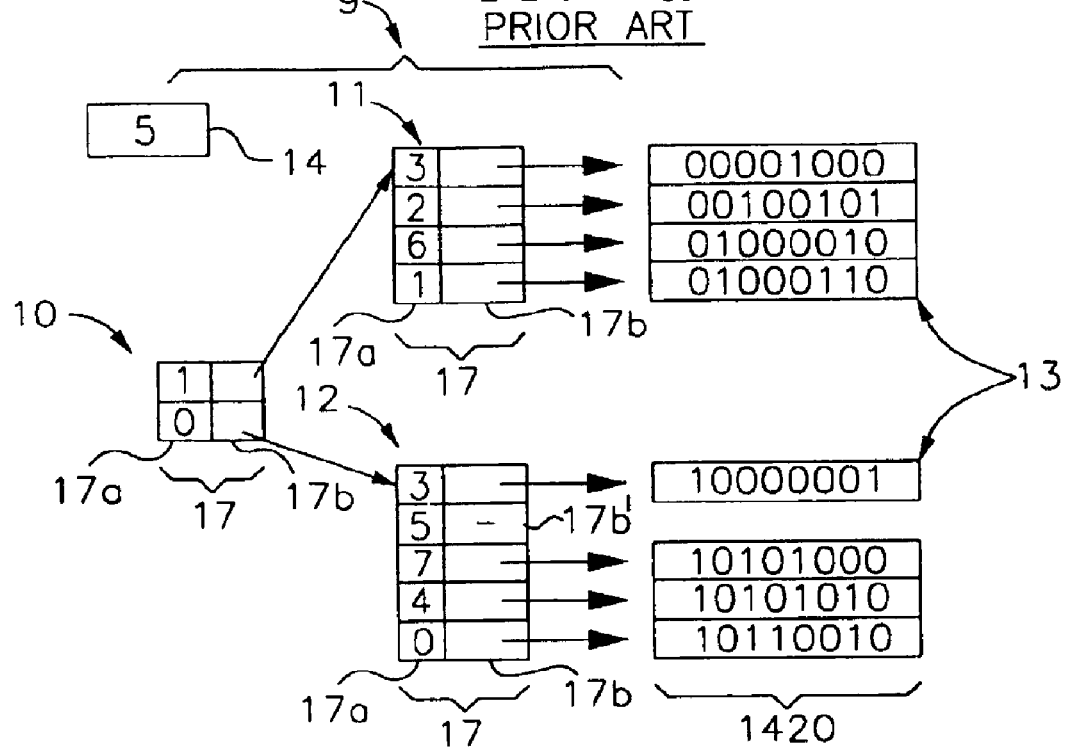
FIG. 3a is a diagram of a O-tree index structure for values stored in a database.

Using the knowledge that key intervals can be constructed from depths of bounding nodes in a 0-complete binary tree, a prior art compact form of the 0-complete binary tree data structure of FIG. 2b is represented at 9 in FIG. 3a. This compact form is called an O-trie. The trie structure has index blocks 10, 11, and 12 with entries 17.

Now, referencing FIG. 4a, a representation of the data storage structure 40 is depicted after the input of a set of search keys 1420 of FIG. 2a. A greater number of search keys can be input into the data storage structure 40, and it would be within the skill of the practitioner in the art to apply the described embodiment to a greater set of keys. As opposed to the $C_0$-trie of FIG. 3a having blocks 10, 11 and 12 with adjacent depth value 17a and pointer 17b entries 17, the data storage structure of FIG. 4a has a trie structure 43 comprised of a root node 47 with an index block header 47a indexed to index block entries 47c and subtrie pointer 47b, a node 34 with an index block header 34a linked to index block entries 34c and subtrie pointer 34b, and node 35 with index block header 35a linked to index block entries 35c and subtrie pointer 35b.

Each entry in 47c, 34c and 35c contains a depth value 89 and a data present indicator 90. In addition, the structure 40 has a separate pointers structure comprised of a pointers header 36 with corresponding entries 36a containing the pointers or referencable indices for the corresponding depth values 89 of leaf index block entries 34c and 35c that are non-NIL. The depth values 89 in 34c and 35c and the indices of pointer entries 36a are representative of the depth values 17a and pointers 17b in index blocks 11 and 12 of FIG. 3a, except that empty pointers corresponding to 0-leaf entries, thereby reducing wasted storage space. The index block entries 47c of node 47 includes entries 30 and 31, corresponding to the entries in index block 10 of FIG. 3a which give the last, i.e., minimum value depth entries in the corresponding index blocks of 34c and 35c, respectively. Pointer 47b of the root level 41 points to the leaf level 64 for key intervals corresponding to each of the index block entries 47c.

In addition to separation of the corresponding depth values 89 into index block entries 47c, 34c and 35c and pointer entries 36a, counts header 66 with corresponding entries 66a is related. Entries 66a contains count entries 32 and 33 that give the total number of F or full leaf (non-NIL) entries in index block entries 34c and 35c, respectively. Thus, count entry 32 has a value of 4 indicating there are 4 non-NIL 4 entries (or F values) in index block entries 34c. Count entry 33 has a value of 4 indicating there are 4 non-NIL entries (or F values) in index block entries 35c. Thus, the data storage structure 40 has a novel O-trie structure 43, a distinct pointers structure 36 and 36a, and a storage container 39. The nodes 34, 35 and 47 and the counts header 66 and counts entries 66a are in the trie structure 43 whereas the referencable indices or pointers are in the separate pointers structure comprised of header 36 and entries 36a.

The trie structure 43 in the FIG. 4a example has a height of two, root level 41 and leaf level 64. Index block entries 47c at root level 41 include two entries 30 and 31, and index block entries structures 34c and 35c at leaf level 64 include four entries 80, 81, 82, 83 and five entries 84, 85, 86, 87, 88, respectively. The height or number of levels of an O-trie storage structure varies depending on the number of data items and associated search keys to be indexed within the leaf entries of the trie structure 43 and on a predetermined full index block number 79 set within the file system. The described FIG. 4a example embodiment has a predetermined full index block number 79 of five.

Depth values 89 are located in index block entries 47c, 34c, 35c that are linked by index block headers 47a, 34a and 35a within the nodes 47, 34 and 35, respectively, of trie structure 43. Pointer entries 36a are linked to trie structure 43 by pointers header 36. Significantly, the data present indicator bit 90 is also in each of the index block entries 47c, 34c and 35c.

Each indicator bit 90 is in one of two conditions, FALSE or TRUE, represented by 0 and 1, respectively. In depth values 89 at the leaf level 64, a TRUE or first condition, indicates that the corresponding entry is a NIL entry of the $C_0$-trie or empty node of a conceptual 0-complete binary tree. A FALSE, or second condition, indicates the corresponding entry is associated with a corresponding data item in the storage device of the computer. Each of the non-NIL entries 80 to 84 and 86 to 88 has a corresponding data item within the storage container 39 of memory 8 of the computer which is addressed by means of one of the pointer entries 36a. A NIL or TRUE entry such as 85 does not address any index entry in 36a or data item in the storage container 39. Each of the pointer entries 36a is a pointer or a referencable index to the corresponding lexically ordered data item, or alternatively to one of the search keys 1420 which is associated with the data item, stored within the storage device of the computer.

Figure 5:
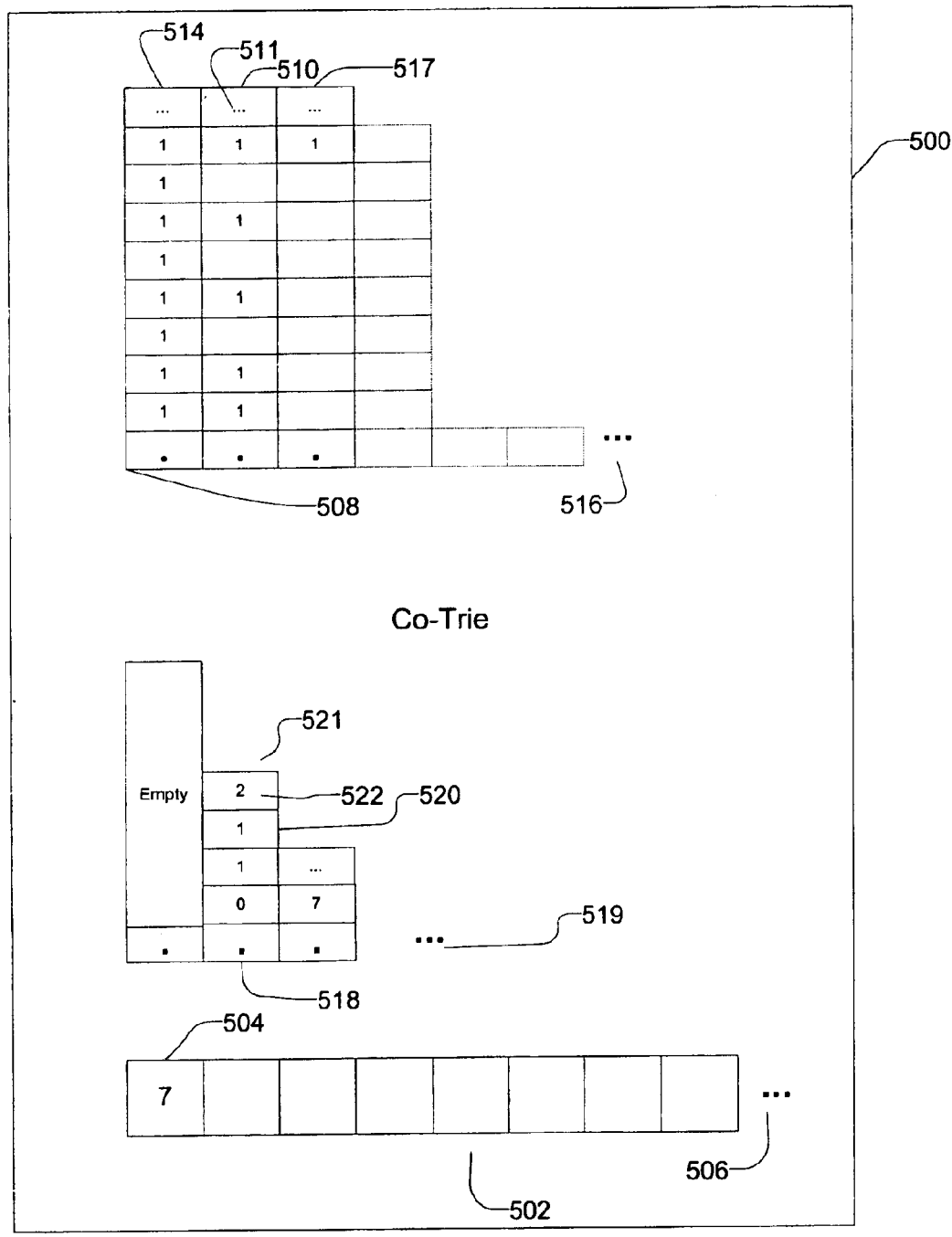
FIG. 5 is a block diagram depicting a data structure used to represent a $C_0$-trie in accordance with an exemplary embodiment of the present invention.

FIG. 5 is a drawing depicting a data structure used to represent a $C_0$-trie in accordance with an exemplary embodiment of the present invention. A $C_0$-trie data structure 500 has three parts: (1) a depth vector 502, (2) a set of selector vectors 508, and (3) a set of counter vectors 518.

A depth vector is a vector including encoded depth values, such as encoded depth value 504, for the depths of the leaves of the implemented $C_0$-trie, encoded to show whether or not the corresponding leaf is a dummy. For example, the nth entry of the depth vector is the encoded depth of the nth leaf. If d is the depth of a leaf, then the encoded depth is 2d if the leaf is not a dummy leaf and 2d+1 if it is a dummy leaf. The depth vector is of arbitrary length as indicated by ellipses 506.

The $C_0$-trie data structure further includes a compound vector 508, herein termed a selector parent, of selector vectors. Each selector vector, such as selector vector 510, corresponds to a 'level' of the $C_0$-trie. Each selector vector is a vector used to select entries of the depth vector and is of arbitrary length, as indicated by ellipses 511. The number of selector vectors in the selector parent is arbitrary, as indicated by ellipses 516. A bottom-most selector vector, such as selector vector 514, is herein termed a "leaf selector vector". A topmost selector vector, such as selector vector 517, is herein termed a "top selector vector." As the selector parent is of arbitrary length, the number of selector vectors is also arbitrary. Therefore, any $C_0$-trie of arbitrary depth may be represented.

The $C_0$-trie data structure further includes a compound vector 518, herein termed a counter parent, of counter vectors. Each selector vector (and hence each level in the $C_0$-trie) has paired with it a corresponding counter vector, such as counter vector 520. As the number of selector vectors is arbitrary, the number of counter vectors, and hence the length of the counter parent, is arbitrary as indicated by ellipses 519. A counter vector is a vector whose length is equal to the number of "1-bits" in the corresponding selector vector. As the size of the selector vectors is arbitrary, so is the size of the counter vectors as exemplified by ellipses 521. The nth entry of the counter vector, such as entry 522, is the number of non-empty leaves contained in the nth subtrie designated by the selector vector.

There are two properties that are maintained in the $C_0$-trie data structure. (1) For any level 1 subtrie A, and its level 1 predecessor B, the depths of all the level l-1 subtries of A are greater than the depths of A and B. In other words, the subtries of A form a $C_0$-trie. A $C_0$-trie data structure with this property is herein termed "well-formed". (2) The values or strings in the index should be distinguished by the shortest possible prefixes. This is accomplished by having each value in the index should be valid or, in other words, there should be no unnecessary empty values or "dummies". A $C_0$-trie data structure with this property is herein said to be "taut".

Figure 6:
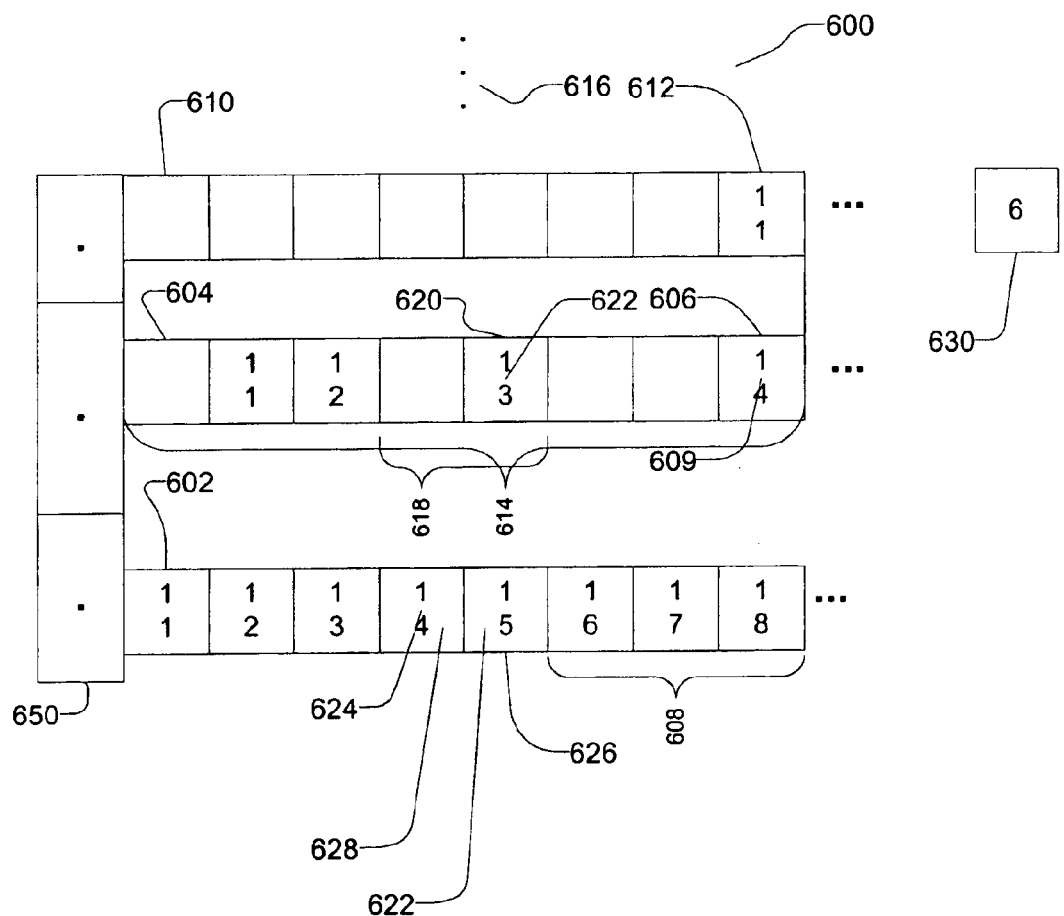
FIG. 6 is a block drawing depicting an illustrative instance of a $C_0$-trie's selection vectors in accordance with an exemplary embodiment of the present invention.

FIG. 6 is a drawing depicting an illustrative instance of a $C_0$-trie's selection vectors in accordance with an exemplary embodiment of the present invention. The selector parent 650 of selector vectors includes a level 1 selector vector 602 selecting all of the leaves of a represented $C_0$-trie and is thus a bit vector the same length as a corresponding depth vector but consisting of all "1-bits". A level 2 selector vector 604 selects level 2 subtries of leaves by having a 1-bit in the position corresponding the last element of a subtrie of level 1. The subtries in each level are indexed by their position in the level. For example, a bit 606 set in second level selector vector selects a set of subtries 608 of level 1. An index for this bit is shown as a "4" 609 beneath the bit. A level 3 selector vector 610 selects subtries of level 2 subtries in the same manner. For example, a bit 612 in the level 3 selector vector selects a level 2 subtrie 614. This placement of level upon level may be repeated for as many levels as necessary to describe a $C_0$-trie of arbitrary size as indicated by ellipses 616. In this example, level 3 is the top level.

Subtries may be selected by their index in a higher level subtrie. For example, a third subtrie 618 of a level 3 subtrie 614 is a level 2 subtrie 618 selected by set bit 620 at an index of "3" 622. The level 2 subtrie 618 includes the level 1 subtries (leaves), 624 and 626, at an index of "4" 628 and an index of "5" 622 respectively.

A searching algorithm for a $C_0$-trie as represented above exploits the properties of a well-formed and taut $C_0$-trie. In a well-formed and taut subtrie, the depth of a subtrie is the depth of its last entry; that is, the depth corresponding to the set bit in a level l selector vector that designates the subtrie.

Figure 8:
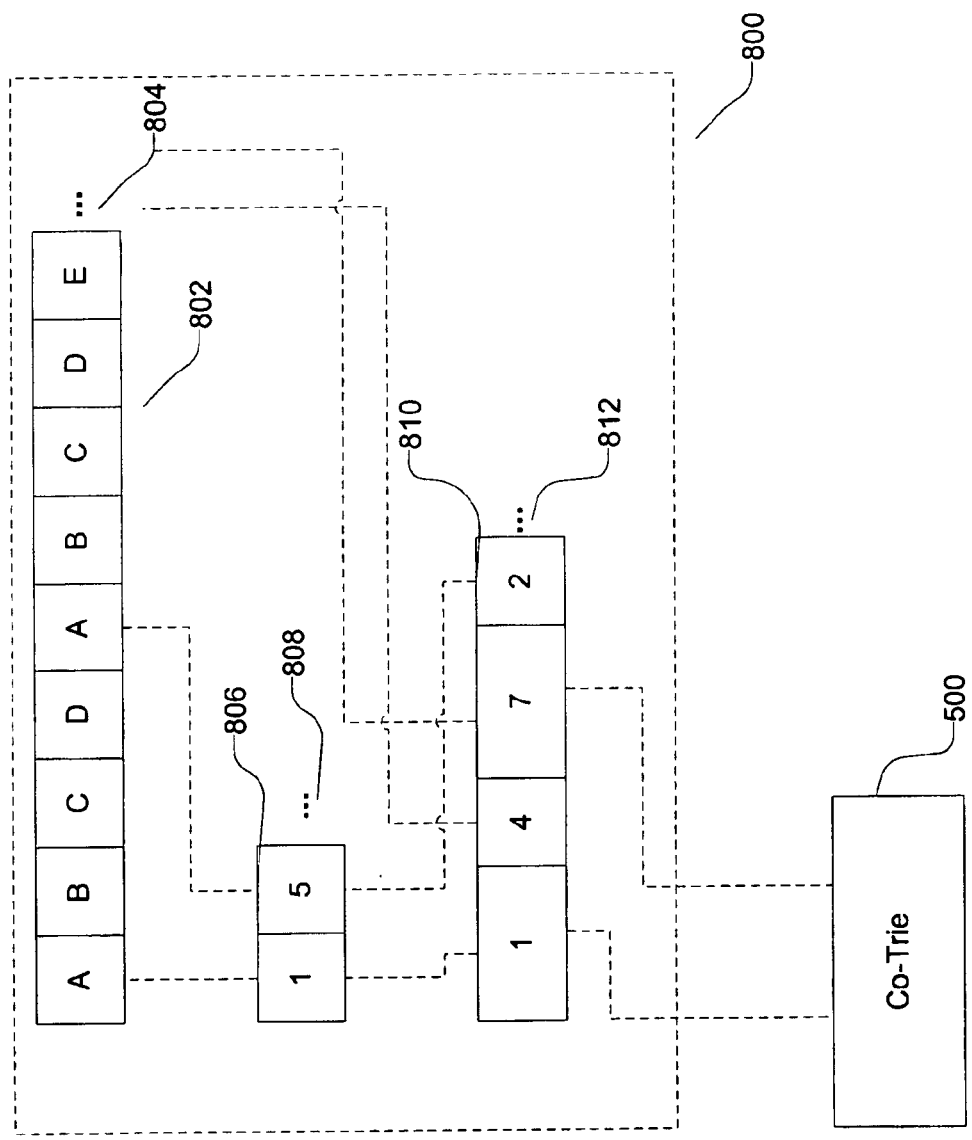
FIG. 8 is a block diagram of a value storage structure in accordance with an exemplary embodiment of the present invention.

FIG. 8 is a diagram depicting a value store data structure in accordance with an exemplary embodiment of the present invention. A value store structure 800 includes three parts: (1) a collection of storage pages 802 including the actual value or data that is to be stored; (2) a byte offset vector 806; and (3) a value identifier vector 810.

The storage pages 802 include the actual value or data that is to be stored. The number of storage pages is arbitrary as indicated by ellipses 804. The storage pages are indexed by byte offset vector 806 wherein a nth offset is the position, in bytes, of the beginning of an nth string in the set of storage pages. The number of values in the byte offset vector is the same as the number of values stored in the set of storage pages as indicated by ellipses 808. Value identifier vector 810 is a vector indexing the byte offset vector by lexical identifier (LID). The number of values in the value identifier vector is the same as in the byte offset vector as indicated by ellipses 812. The LID is thus an index in lexicographical order of the values. For example, a string value that is $5^{th}$ in lexicographical order corresponds to the LID 5.

Figure 7:
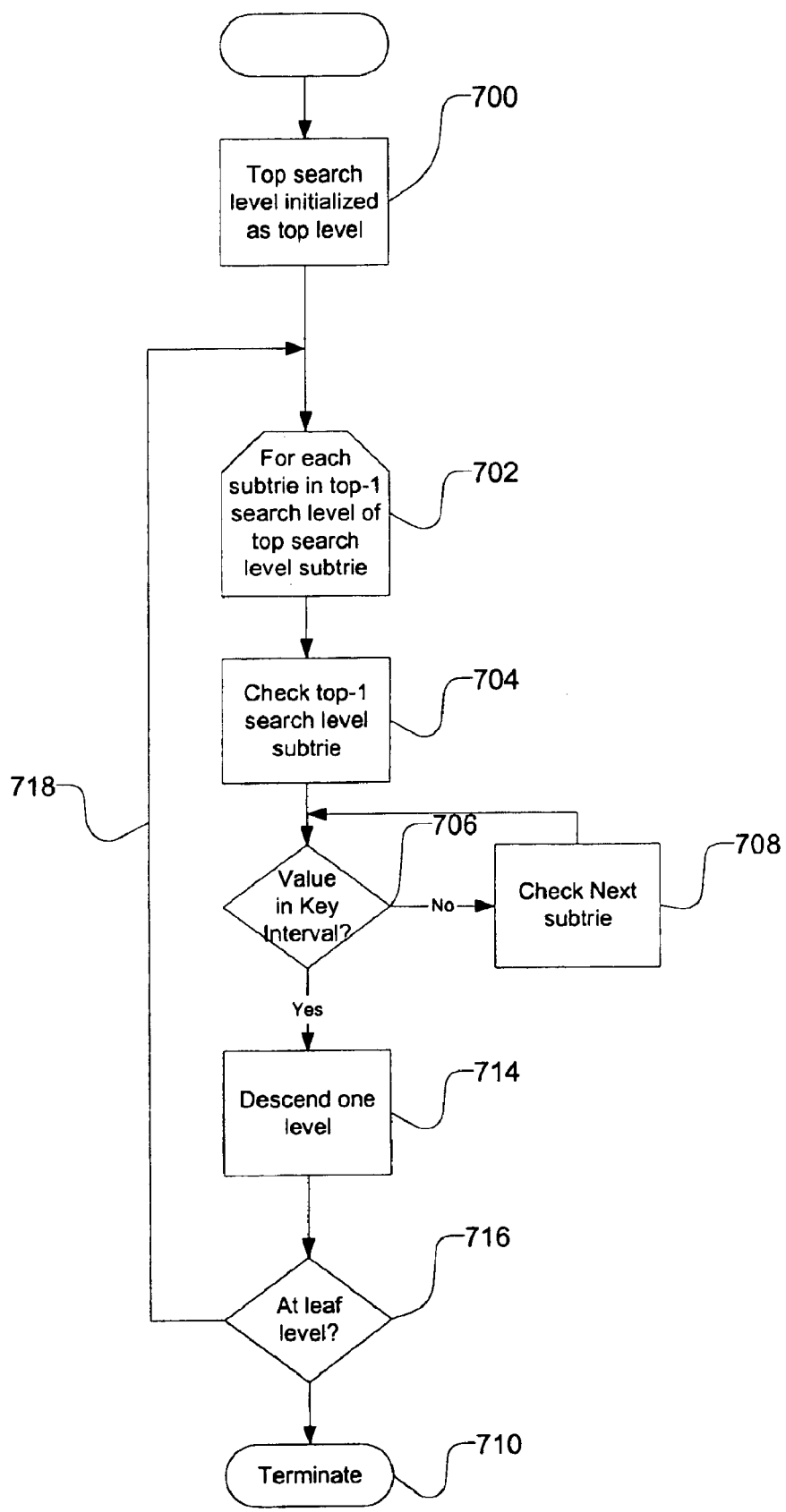
FIG. 7 is a process flow diagram of a $C_0$-trie search process in accordance with an exemplary embodiment of the present invention.

FIG. 7 is a process flow diagram of a $C_0$-trie search process in accordance with an exemplary embodiment of the present invention. The process starts (700) at a top level of the $C_0$-trie, herein called the "top search level". For (702) each subtrie in a next level beneath the top search level, herein termed the "top-1 search level", the process searches (704) depths of the top-1 search level subtries. Only the depth values selected by the top-1 search level selector vector need to be examined because the $C_0$-trie is well-formed as previously described. If the value is not identified (706) as being part of the current top-1 search level subtrie, the process continues (708) searching the remaining top-1 level subtries.

When a top-1 search level subtrie including the searched for value is identified (706), the process descends (714) one level thus making the current top-1 search level the top search level and the identified top-1 search level subtrie an identified top search level subtrie. The process determines (716) if the new top search level is the previously described leaf selector level. If not, the process continues searching (718), and searches the top-1 search level subtries of the identified top search level subtrie. In this way, a search is limited to only one subtrie per search level.

Figure 9:
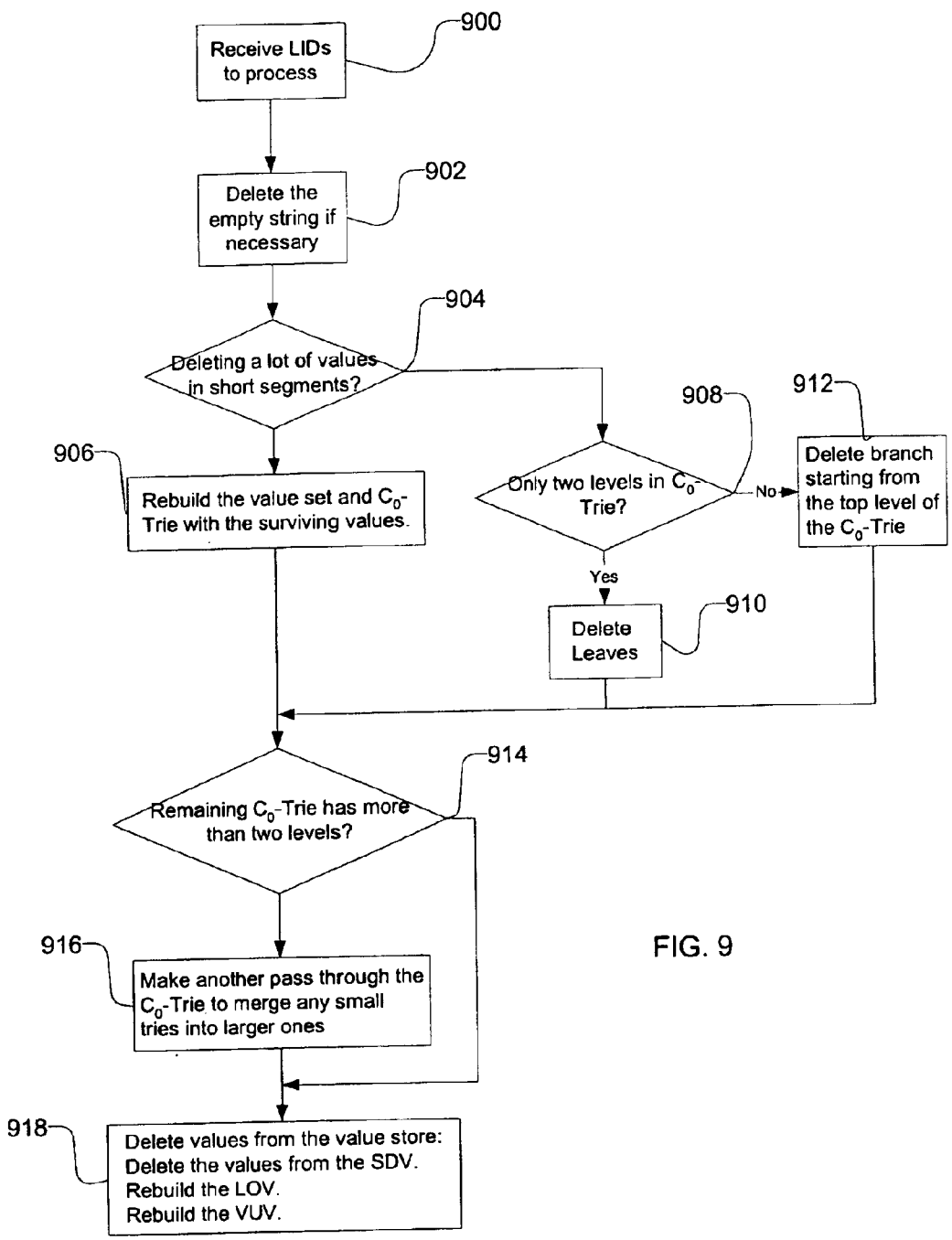
FIG. 9 is a process flow diagram of a deletion process in accordance with an exemplary embodiment of the present invention.

FIG. 9 is a process flow diagram of a deletion process in accordance with an exemplary embodiment of the present invention. A delete process deletes values from a $C_0$-trie and rebuilds the $C_0$-trie through a merging process in order to ensure the $C_0$-trie remains well-formed. A delete process receives (900) a list of LIDs to delete. The delete process determines (902) if the empty string should be deleted. If the delete process determines (904) that a lot of LIDs are to be deleted in short segments, the delete process rebuilds (906) a new $C_0$-trie using the remaining values in the old $C_0$-trie. The threshold value for determining when a new $C_0$-trie should be created rather than deleting values from and merging the remaining old $C_0$-trie is application specific and depends on the relative speed of the delete process and the insert process.

If only a small number of LIDs are to be deleted or a few big segments, then the delete process determines (908) if the $C_0$-trie being operated on has only two levels. If there are only two levels, then leaves including the LIDs to be deleted may be readily deleted. However, if the $C_0$-trie has more than two levels, then a branch delete process is called (912) to traverse the branch of the $C_0$-trie including LIDs to be deleted and delete LIDs from that branch of the $C_0$-trie.

Once the LIDs have been deleted from the $C_0$-trie, the delete process determines (914) if the remaining $C_0$-trie has more than two remaining levels. If so, the delete process examines (916) the entire $C_0$-trie and merges subtries where possible. Once the values have been deleted from the $C_0$-trie and the $C_0$-trie has been merged as needed, then the actual values are deleted (918) from the previously described data store.

Figure 10:
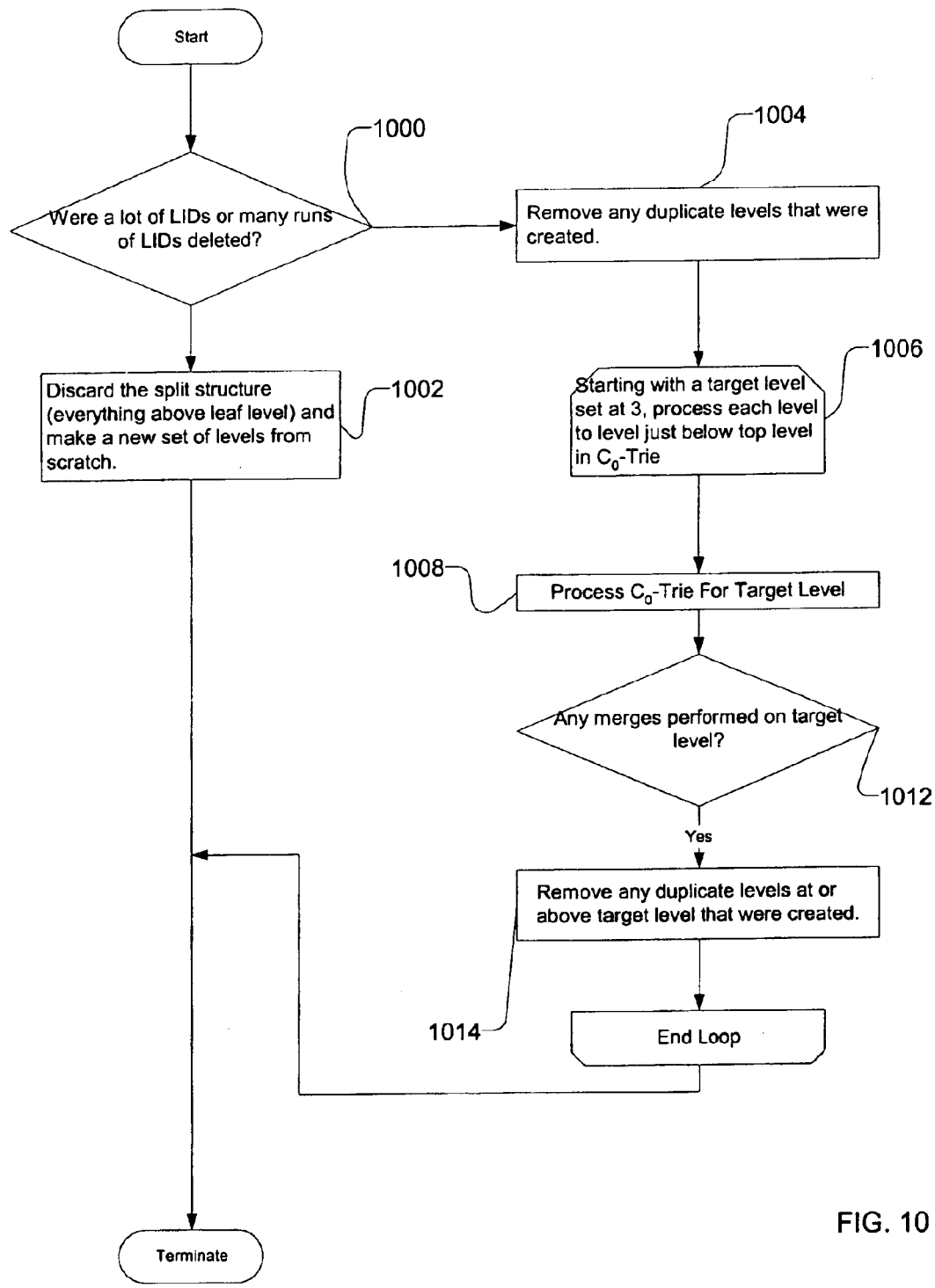
FIG. 10 is a process flow diagram of a $C_0$-trie merge control process in accordance with an exemplary embodiment of the present invention.

FIG. 10 is a process flow diagram of a $C_0$-trie merge control process in accordance with an exemplary embodiment of the present invention. The merge control process determines (1000) if a large number of LIDs and a large number of runs of LIDs were deleted from the $C_0$-trie being processed. If so, the merge control process discards (1002) the existing $C_0$-trie except for the leaf level and then rebuilds the $C_0$-trie's levels.

If the merge control process determines that a small number of LIDs or a small number of runs of LIDs were deleted from the $C_0$-trie being processed, the merge control process removes (1004) any duplicate levels in the $C_0$-trie that may have been created during the deletion process. The merge control process starts (1006) at the top level of the $C_0$-trie and traverses each changed subtrie down to a target level. Once the target level is reached, the merge control process calls a merge process that merges (1008) subtries as needed. The merge control process determines (1012) if any merges were actually performed on the target level by the merge process. If so, the merge control process deletes (1014) any duplicate levels that might have been created during the merge process.

Figure 11:
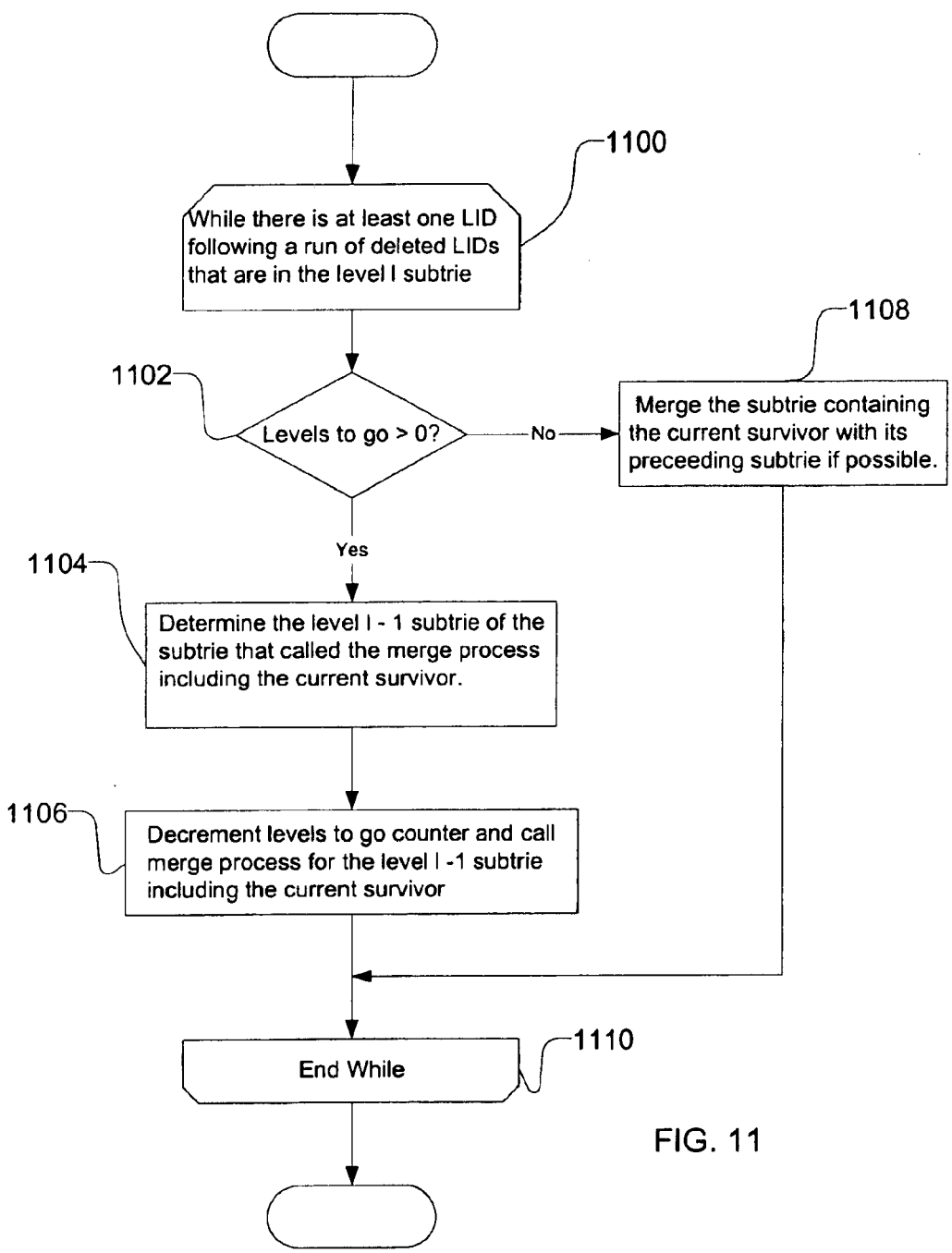
FIG. 11 is a process flow diagram of a $C_0$-trie merge process as used in an exemplary embodiment of the present invention.

FIG. 11 is a process flow diagram of a $C_0$-trie merge process as used in an exemplary embodiment of the present invention. The merge process is called by the previously described merge control process in order to traverse a subtrie to a target level and then merge subtries at the target level. A subtrie is a candidate for merging if it includes LIDs whose preceding neighbors have been deleted during the previously described deletion process, thus isolating an LID. An isolated LID is herein termed a "survivor" LID. The merge process receives as arguments a level l which is the current working level in the subtrie and a counter of the number of levels to go before the merge process can cease traversing the subtrie and merge isolated LIDs. The merge process determines (1100) if there are any LIDs following a run of deleted LIDs that are in level l of the subtrie. While there is at least one LID following a run of deleted LIDs, the merge process determines (1102) if it has traversed the subtrie down to the target level by checking the levels-to-go variable. If the merge process has more levels-to-go, the merge process determines (1104) the subtrie in the level below the current level l with the isolated LID, decrements (1106) the levels-to-go counter and recursively calls itself with a new level setting and the decremented levels to go counter. If the merge process determines (1102) that it has reached the target level by examining the levels-to-go counter, the merge process merges (1108) the subtrie including a survivor LID with the subtrie's preceding subtrie if possible. The merge process continues until all survivor LIDs have been processed (1110). Once all of the subtries on a target level have been processed, the target level is increased by one and processing continues.

Figure 12:
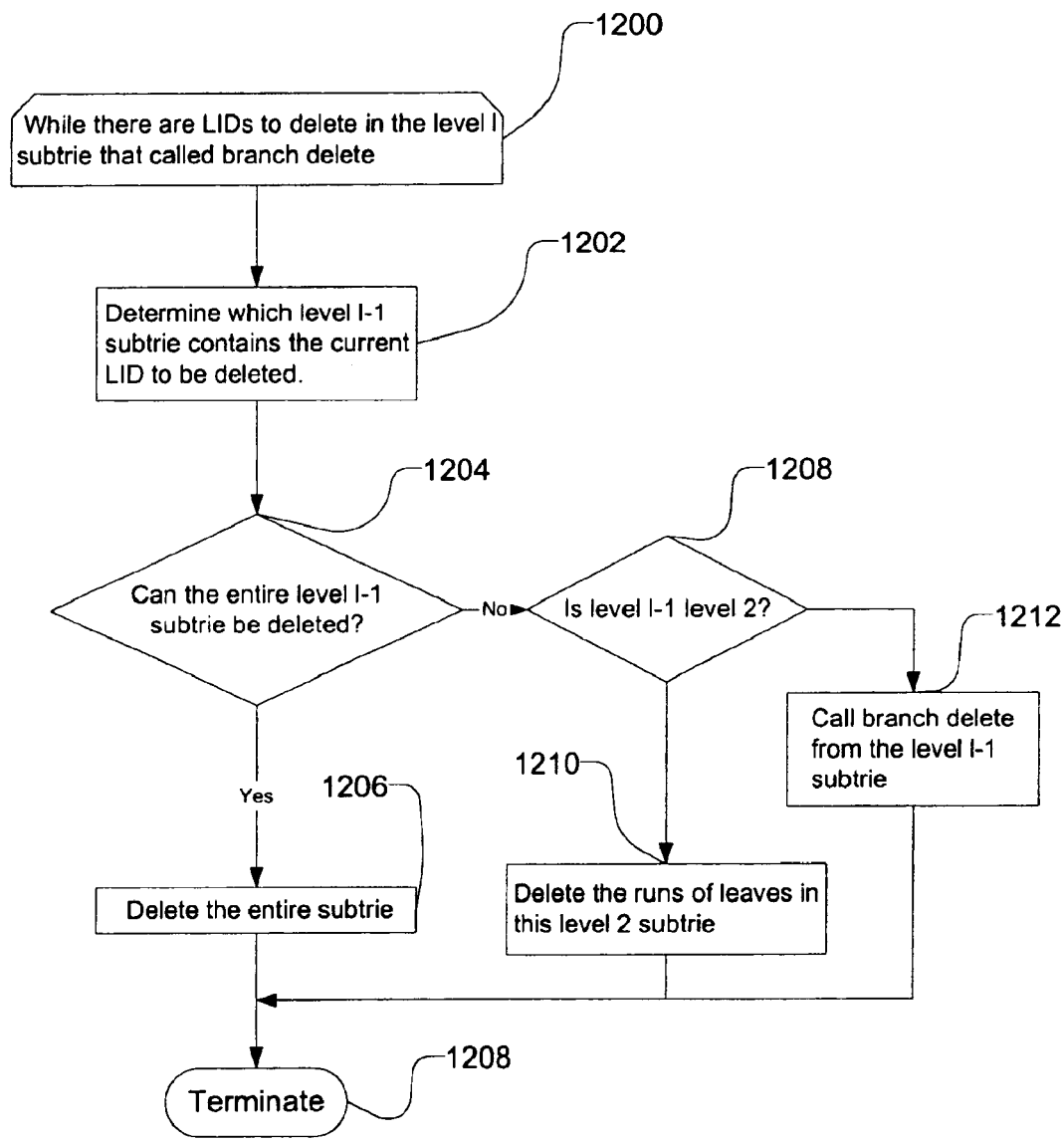
FIG. 12 is a process flow diagram of a branch delete process in accordance with an exemplary embodiment of the present invention.

FIG. 12 is a process flow diagram of a branch delete process in accordance with an exemplary embodiment of the present invention. The branch delete process determines (1200) if there are LIDs that need to be deleted in a current level 1 subtrie for which branch delete was called. While there are LIDs to delete, the branch delete process identifies (1202) which subtrie in a level immediately below the current level include the LID. If the branch delete process determines (1204) that the identified subtrie can be deleted, such as when the identified subtrie includes only a single LID or a number of deleted LIDs in a row, the branch delete process deletes the entire subtrie and terminates without traversing the subtrie any further.

If the identified subtrie cannot be deleted, the branch delete process determines (1208) if the level below the current level is the previously described level 2 of the $C_0$-trie. If so, the branch delete process deletes the runs of leaves of the $C_0$-trie as requested by the delete process. If not, the branch delete process recursively calls itself (1212) to continue processing the subtrie in the level immediately below the current level.

Figure 13:
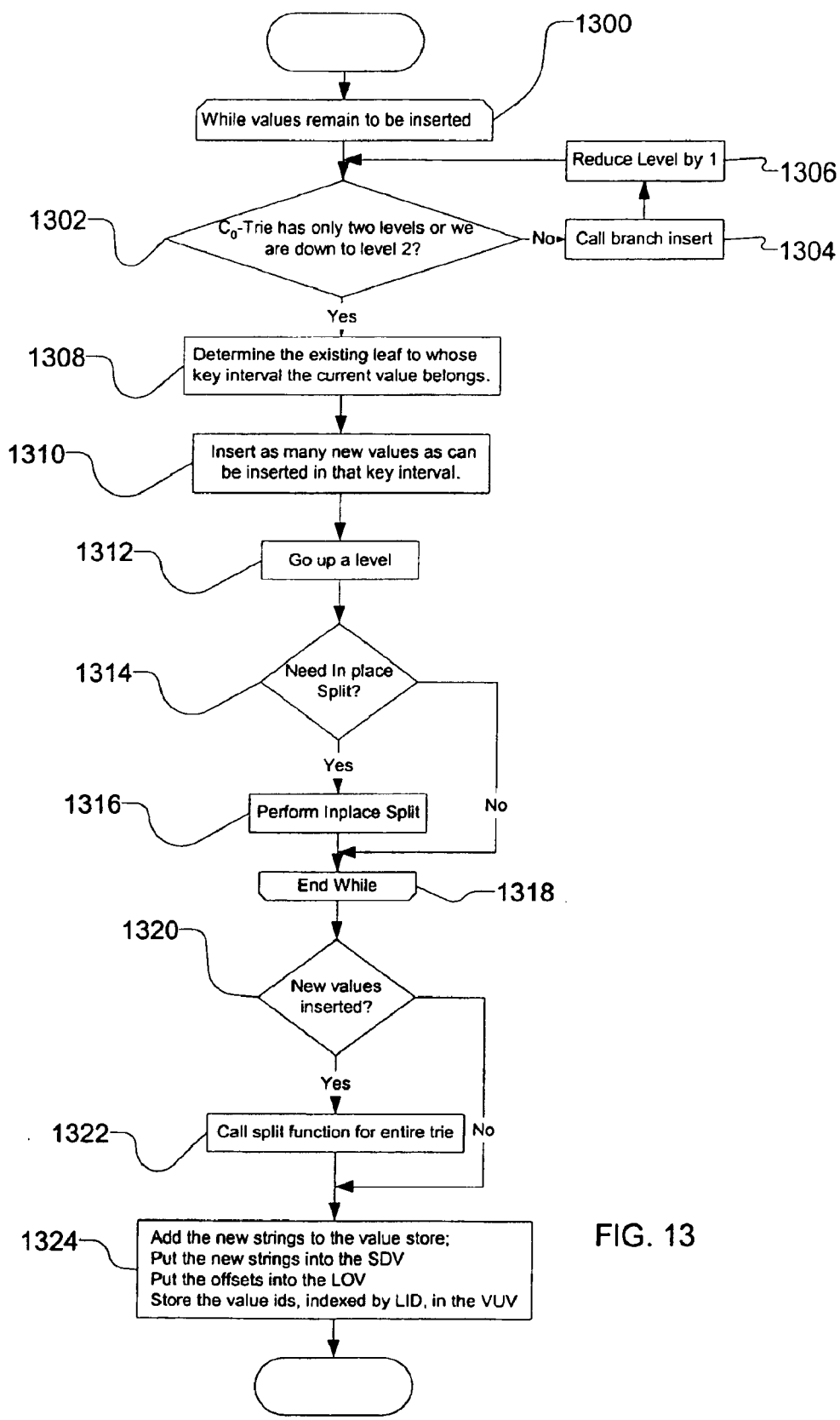
FIG. 13 is a process flow diagram of an insertion process in accordance with an exemplary embodiment of the present invention.

FIG. 13 is a process flow diagram of an insertion process in accordance with an exemplary embodiment of the present invention. While (1300) the insertion process has values to insert into the $C_0$-trie, the insert process determines (1302) if the $C_0$-trie has only two levels. If so, the insertion process determines (1304) which existing leaf includes the key interval to which a value belongs. Once the existing leaf is identified, the insertion process inserts as many values as possible into the identified key interval. If the $C_0$-trie has more than two levels, the insertion process calls a to-be-described branch insertion process 1308 to traverse the $C_0$-trie and insert values into the $C_0$-trie at the appropriate level. A subtrie is split when it no longer has the property of being well-formed because it now includes new values that have a depth less than or equal to the depth of the subtrie or the subtrie's predecessor in a particular level.

After all of values have been inserted (1310) the insertion process determines (1312) if any new values have been inserted. If so, the insertion process determines if any of the subtries of the $C_0$-trie should be split because the $C_0$-trie has grown too large for efficient manipulation. The insertion process splits a subtrie by calling (1316) a to-be-described navigate-and-split function from the top level of the $C_0$-trie. After the $C_0$-trie has been processed (1318), the insertion process adds (1320) the new values to the actual value store.

Figure 14:
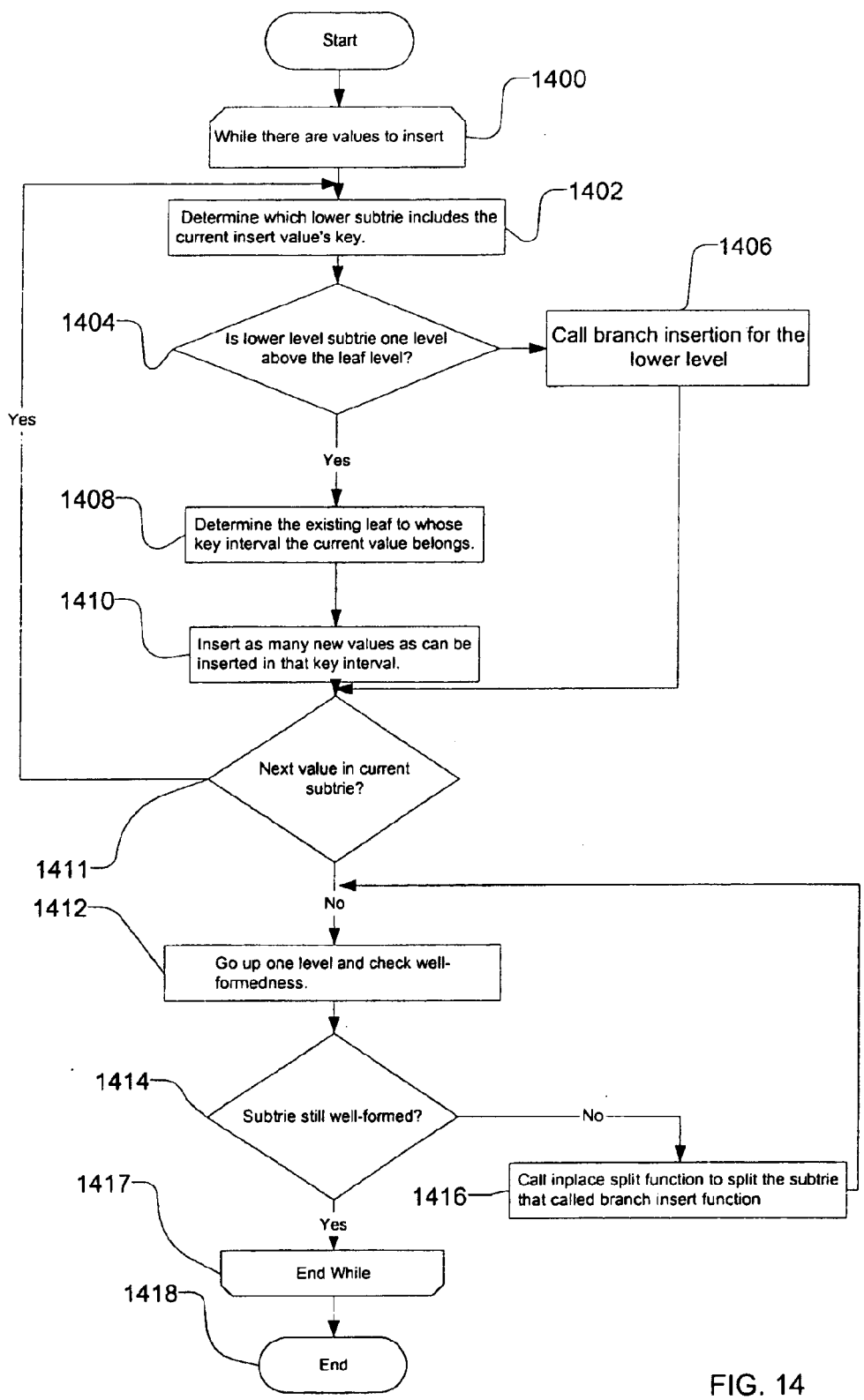
FIG. 14 is a process flow diagram of a branch insertion process in accordance with an exemplary embodiment of the present invention.

FIG. 14 is a process flow diagram of a branch insertion process in accordance with an exemplary embodiment of the present invention. While (1400) there are values to insert, the branch insertion process determines (1402) which level immediately below a current level includes the subtrie whose key interval includes the value's. If the branch insertion process determines (1404) the level immediately below the current level is not the level above the leaf level, the branch insertion process recursively calls itself for operation on the level immediately below the current level.

If the branch insertion process determines (1404) the level immediately below the current level is the level above the leaf level, the branch insertion process determines (1408) which leaf key interval includes the inserted value's key and inserts (1410) as many values as possible into the key interval. The branch insertion process then checks (1411) if the next value is not in the current subtrie. If the next value is not in the current subtrie, the branch insertion process moves (1412) up the trie one level and determines (1414) if the $C_0$-trie is still well-formed. If not, the branch insertion process performs a split (1416) on the subtrie into which the values were inserted. The branch insertion process continues until all values have been inserted (1417). Once the values have been inserted, the branch insertion process ends (1418).

Figure 15:
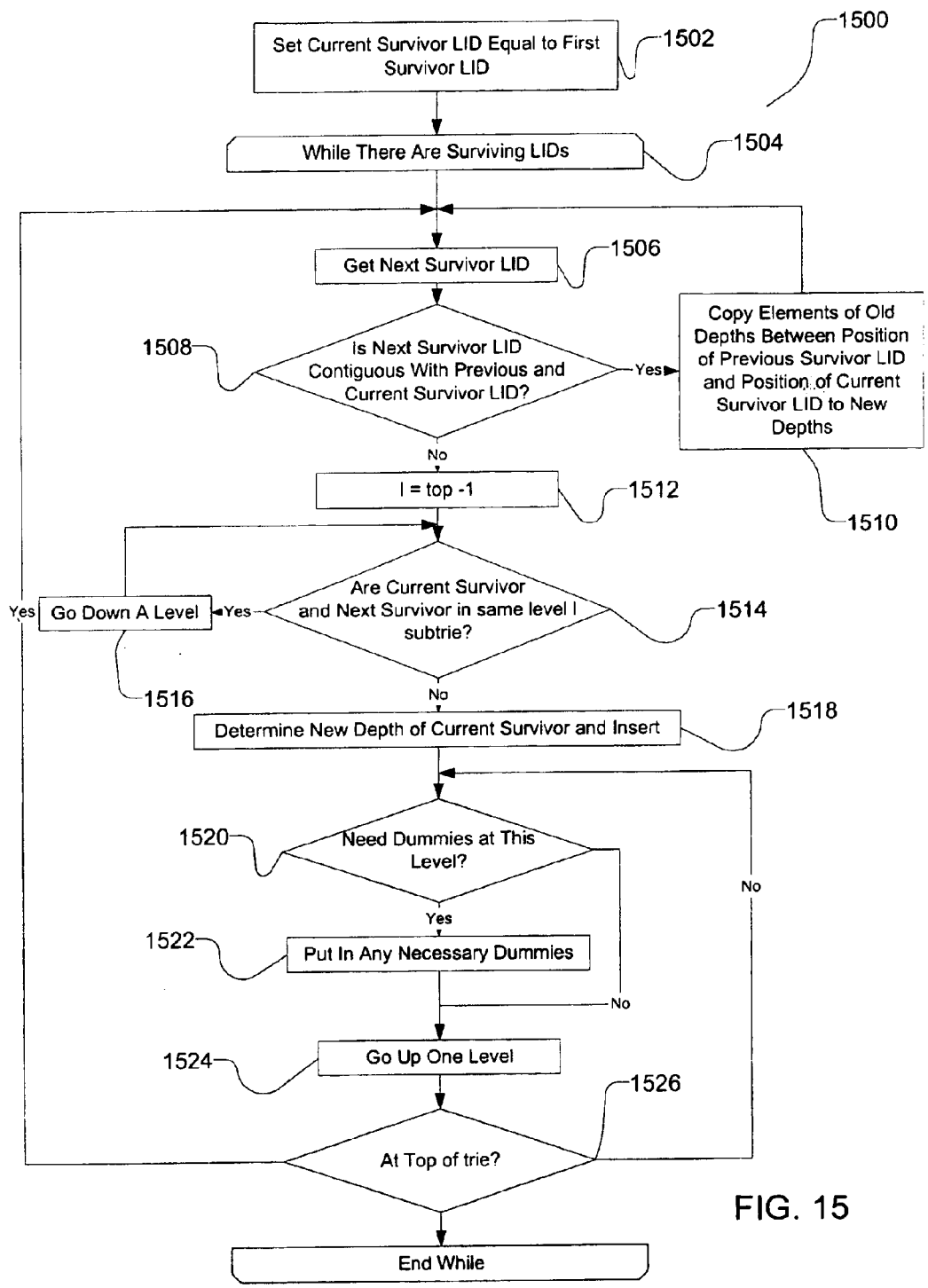
FIG. 15 is a process flow diagram of a $C_0$-trie rebuilding process in accordance with an exemplary embodiment of the present invention.

FIG. 15 is a process flow diagram of a $C_0$-trie rebuilding process in accordance with an exemplary embodiment of the present invention. A $C_0$-trie rebuilding process 1500 exploits the fact that the representations of the $C_0$-tries are taut and well-formed. The $C_0$-trie rebuilding process uses the previously described depth vectors and counter vectors to rebuild a $C_0$-trie using the $C_0$-trie's remaining subtries. Rebuilding a $C_0$-trie is less time consuming than regenerating an entire $C_0$-trie after a deletion process. During the rebuilding process, the previously described LIDs are used to keep track of elements within the trie; however, if the empty string is in the value store, the empty string is LID 1 but the empty string is not in the trie. Then the first element in the trie is LID 2. The $C_0$-trie rebuilding process sets (1502) a current survivor LID equal to a first survivor LID. While (1504) there are more surviving LIDs to process, the $C_0$-trie rebuilding process gets (1504) the next survivor LID and determines (1508) if the next survivor LID is contiguous with a previous survivor LID and the current survivor LID. If this condition is met, then there are three surviving LIDS in a row and the depth of the current survivor LID and any dummy entries preceding it are the same as in the old depths. If so, the $C_0$-trie rebuilding process copies (1510) the elements at the old depths located between position of the previous survivor LID and the position of the current survivor LID. This is possible because the depth of the previous survivor LID and the depth of the current survivor LID are unchanged and the positions of the depths in the old depths vector are unchanged.

If the $C_0$-trie rebuilding process determines that the next survivor LID is not contiguous with a previous survivor LID and the current survivor LID, the $C_0$-trie rebuilding process starts at a level below the $C_0$-trie's topmost level (1512) and determines if the current survivor LID and the next survivor LID are in the same level subtrie. If so, the $C_0$-trie rebuilding process descends (1516) one more level into the $C_0$-trie and makes the determination again. If the $C_0$-trie rebuilding process determines that the current survivor LID and the next survivor LID are in not the same level subtrie, the $C_0$-trie rebuilding process determines (1518) the depth of the current survivor LID as described in FIG. 16. The $C_0$-trie rebuilding process then determines (1520) if the $C_0$-trie needs new dummy entries at the depth of the current survivor LID. If so, the $C_0$-trie rebuilding process puts (1522) any needed dummies in as described in FIG. 17. If no new dummy entries are needed, or after any needed dummies are created, the $C_0$-trie rebuilding process goes (1524) up one level in the $C_0$-trie and determines (1526) if the $C_0$-trie rebuilding process is back at the top of the $C_0$-trie. If so, the $C_0$-trie rebuilding process continues processing by getting (1506) the next survivor LID. If not, the $C_0$-trie process continues processing the $C_0$-trie by moving up the $C_0$-trie's levels and determining (1520) if the $C_0$-trie needs new dummy entries at each level.

Figure 16:
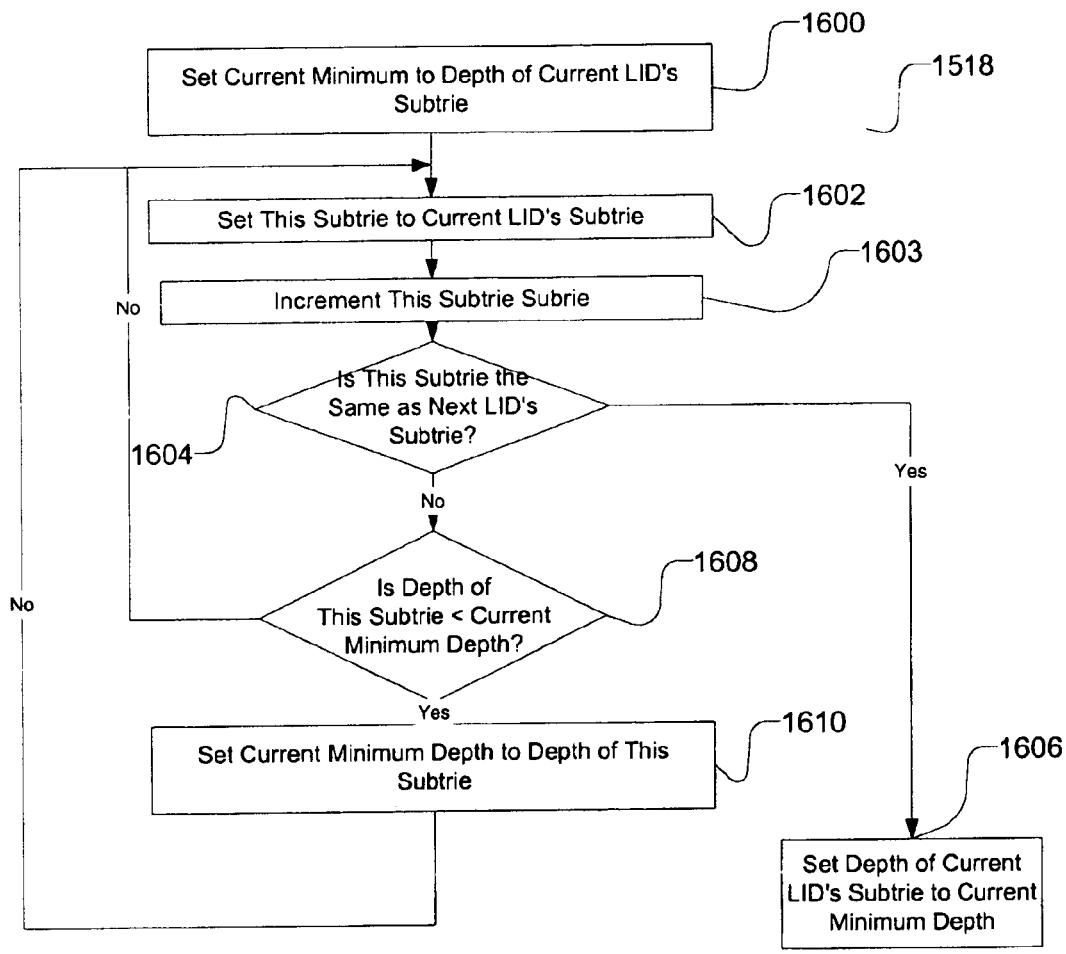
FIG. 16 is a process flow diagram of a subtrie depth determination process as used by a $C_0$-trie rebuilding process in accordance with an exemplary embodiment of the present invention.

FIG. 16 is a process flow diagram of a subtrie depth determination process as used by a $C_0$-trie rebuilding process in accordance with an exemplary embodiment of the present invention. The $C_0$-trie rebuilding process uses a subtrie depth determination process 1518 to determine the minimum depth of the subtries to which a LID belongs. The subtrie depth determination process does so by stepping through the previously described depths vector looking for the minimum depth of the subtries between the current survivor LID's subtrie and the next survivor LID's subtrie. The subtrie depth determination process sets (1600) a current minimum depth to a the depth of the current survivor LID's subtrie. The subtrie depth determination process then gets (1602) a subtrie to process and increments (1603) the selected subtrie. The subtrie depth determination process determines (1604) if the subtrie is the next survivor LID's subtrie. If so, the subtrie depth determination process sets (1608) the depth of the current survivor LID's subtrie to the current minimum value. Otherwise, the subtrie depth determination process determines (1610) if the depth of the subtrie is less than the current minimum depth. If so, the subtrie depth determination process sets the current minimum depth the depth of the subtrie. In either case, the subtrie depth determination process continues processing by getting (1602) another subtrie to process.

FIG. 17 is a pseudocode listing of a dummy placement process in accordance with an exemplary embodiment of the present invention. If a dummy placement process 1522 determines (1700) that dummies may need to be placed in the current level of subtries, the dummy placement process sets (1701) a current minimum value at the last depth value in a temporary depth value vector (not shown) maintained to reconstruct the $C_0$-trie. The temporary depth values vector includes depths needed for current LID in a new depths vector, and is filled in backwards from the way it will be put in the new depths vector created as the $C_0$-trie is rebuilt. Therefore, the current minimum is the depth of either the current LID of FIG. 15 and FIG. 16 or the depth of the latest dummy put in the subtrie by the dummy placement process. The dummy placement process steps backwards in the subtries at this level, starting with the current LID's subtrie-1 (1702). If the dummy placement process determines (1704) that the subtrie's position is greater than the previous position and determines (1706) the depth of the subtrie is less than the current minimum, the dummy placement process puts (1708) a dummy of subtrie's depth at the end of the temporary depth vector and sets (1710) the current minimum to the subtrie's depth. If the subtrie's position is not greater than the previous position, the dummy placement process stops (1712) processing the for loop.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A computer implemented data structure for representing a $C_0$-trie, comprising:
a depth vector having encoded depth values for depths of leaves of the $C_0$-trie, the depth vector being encoded to show whether or not the corresponding leaf is an empty leaf node and being of arbitrary length;
a set of selector vectors, grouped in a compound vector, each selector vector corresponding to a level of the $C_0$-trie, each selector vector being a bit vector used to select entries of the depth vector and the number of selector vectors in the set of selector vectors being arbitrary; and
a set of counter vectors, grouped in a compound vector, each selector vector having paired therewith a corresponding counter vector, the counter vector being a vector whose length is equal to the number of 1-bits in the corresponding selector vector.

2. The computer implemented data structure of claim 1, wherein for any level 1 subtrie A of the $C_0$-trie, and its level 1 predecessor B, the depths of all the level 1-1 subtries of A are greater than the depths of A and B; and wherein values or strings in the $C_0$-trie are distinguished by the shortest possible prefixes y having no empty nodes included in the leaves of the subtries.

3. The computer implemented data structure of claim 1, wherein the $C_0$-trie is a representation of a 0-complete tree.

4. The computer implemented data structure of claim 1, wherein each encoded depth value further indicates a depth of the corresponding leaf.

5. The computer implemented data structure of claim 1, wherein a particular selector vector associated with a particular level of the $C_0$-trie identifies one or more entries in the depth vector also associated with the particular level of the $C_0$-trie.

6. The computer implemented data structure of claim 1, wherein the counter vector stores a number of non-empty leaves in a portion of the $C_0$-trie designated by a corresponding selector vector.

7. A computer implemented $C_0$-trie search process, comprising:
for each subtrie in a next level beneath a top search level, searching depths of the top-1 search level subtries;
examining depth values selected by the top-1 search level selector vector;
if the value is not identified as being part of the current top-1 search level subtrie, determining if here are any remaining top-1 level subtries to search;
if there are not any remaining top-1 level subtries to search, terminating the process and if there are more top-1 level subtries to search, continuing searching the remaining top-1 level subtries;
when a top-1 search level subtrie including the searched for value is identified, descending the process one level by making the current top-1 search level th top search level and the identified top-1 search level subtrie an identified top search level subtrie; and
determining if a new top search level is a leaf selector level and if not, continuing searching the top-1 search level subtries of the identified top search level subtrie.

8. A computer implemented $C_0$-trie delete process, comprising:
receiving a list of lexical identifiers to delete;
if the number of lexical identifiers to be deleted exceeds a threshold value, then generating a new $C_0$-trie using remaining lexical identifiers in the $C_0$-trie;
if the number of lexical identifiers to be deleted does not exceed the threshold value then performing the following:
if there are only two levels in the $C_0$-trie then deleting leaves including the lexical identifiers;
if the $C_0$-trie has more than two levels, then performing the following:
traversing a branch of the $C_0$-trie including a lexical identifier to be deleted; and
deleting the lexical identifier from the branch of the $C_0$-trie;
if the remaining $C_0$-trie has more than two levels, then examining the $C_0$-trie and merging subtries of th $C_0$-trie.

9. A computer implemented $C_0$-trie insert process, comprising:
receiving values to insert;
if the $C_0$-trie has two levels, then performing the following:
while there are values to insert, iteratively performing the following:
identifying a key interval in an existing leaf of the $C_0$-trie to which a value belongs; and
inserting one or more values into the identified key interval;
splitting a subtrie of the $C_0$-trie if the subtrie includes new values that have a depth less than or equal to the depth of the subtree; and
after all values have been inserted, examining the $C_0$-trie and splitting as needed.

10. The process of claim 9, further comprising:
if the $C_0$-trie has more than two levels, then performing the following:
while there are values to insert, iteratively performing the following:
while a selected level immediately below a current level is not a level above a leaf level, recursively determining which level immediately below the current level includes a subtrie of the $C_0$-trie whose key interval includes a value and selecting the determined subtrie;
identifying a key interval in an existing leaf of the $C_0$-trie to which a value belongs; and
inserting one or more value into the identified key interval;
splitting the subtrie if the subtrie includes new values that have a depth less than or equal to the depth of the subtree; and
after all values are inserted examining the $C_0$-trie and splitting subtries as needed.

11. A data processing system for implementing a $C_0$-trie, comprising:
a processor; and
a memory coupled to the processor, the memory having processor executable program instructions stored therein, the program instructions including:
providing a depth vector having encoded depth values for depths of leaves of an $C_0$-trie, the depth vector being encoded to show whether or not the corresponding leaf is an empty leaf node and being of arbitrary length;
providing a set of selector vectors, grouped in a compound vector, each selector vector corresponding to a level of the $C_0$-trie, each selector vector being a vector used to select entries of the depth vector and the number of selector vectors in the set of selector vectors being arbitrary; and
providing a set of counter vectors, grouped in a compound vector, each selector vector having paired therewith a corresponding counter vector, the counter vector being a vector whose length is equal to the number of 1-bits in the corresponding selector vector.

12. The data processing system of claim 11,
wherein for any level l subtrie A of the compact $C_0$-trie, and its level l predecessor B, the depths of all the level l-1 subtries of A are greater than the depths of A and B; and
wherein values or strings in the compact $C_0$-trie are distinguished by the shortest possible prefixes by having no empty nodes included in the leaves of the subtries.

13. A data processing system for implementing a $C_0$-trie search process, comprising:
a processor; and
a memory coupled to the processor, the memory having processor executable program instructions stored herein, the program instructions including:
for each subtrie in a next level beneath a top search level, searching depths of the top-1 search level subtries;
examining depth values selected by the top-1 search level selector vector;
if the value is not identified as being part of the current top-1 search level subtrie, determining if there are any remaining top-1 level subtries to search;
if there are not any remaining top-1 level subtries to search, terminating the process and if there are more top-1 level subtries to search, continuing searching the remaining top-1 level subtries;
when a top-1 search level subtrie including the searched for value is identified, descending the process one level by making the current top-1 search level the top search level and the identified top-1 search level subtrie an identified top search level subtrie; and
determining if a new top search level is a leaf selector level and if not, continuing searching the top-1 search level subtries of the identified top search level subtrie.

14. A data processing system for implementing a $C_0$-trie delete process, comprising:
a processor; and
a memory coupled to the processor, the memory having processor executable program instructions stored therein, the program instructions including:
receiving a list of lexical identifiers to delete;
if the number of lexical identifiers to be deleted exceeds a threshold value, then generating new $C_0$-trie using remaining lexical identifiers in the $C_0$-trie;
if the number of lexical identifiers to be deleted does not exceed the threshold value then performing the following:
if there are only two levels in the $C_0$-trie then deleting leaves including the lexical identifiers;
if the $C_0$-trie has more than two levels, then performing the following:
traversing a branch of the $C_0$-trie including a lexical identifier to be deleted; and
deleting the lexical identifier from the branch of the $C_0$-trie;
if the remaining $C_0$-trie has more than two levels, then examining the $C_0$-trie and merging subtries of the $C_0$-trie.

15. A data processing system for implementing a $C_0$-trie insert process, comprising:
a processor; and
a memory coupled to the processor, the memory having processor executable program instructions stored therein, the program instructions including:
receiving values to insert;
if the $C_0$-trie has two levels, then performing the following:
while there are values to insert, iteratively performing the following:
identifying a key interval in an existing leaf of the $C_0$-trie to which a value belongs; and
inserting one or more values into the identified key interval;

splitting a subtrie of the $C_0$-trie if the subtrie includes new values that have a depth less than or equal to the depth of the subtree; and after all values have been inserted, examining the $C_0$-trie and splitting as needed.

16. The data processing system of claim 15, the program instructions further including:

if the $C_0$-trie has more than two levels, then performing the following:

while there are values to insert, iteratively performing the following:

while a selected level immediately below a current level is not the level above a leaf level, recursively determining which subtrie immediately below the current level's subtrie includes a key interval which includes value and selecting the determined subtrie;

identifying a key interval in an existing leaf of the $C_0$-trie to which a value belongs; and inserting one or more value into the identified key interval;

splitting the subtrie if he subtrie includes new values that have a depth less than or equal to the depth of the subtree; and after all values have bee inserted, examining the $C_0$-trie and splitting subtries as needed.

17. A computer program product embodying computer program instructions for implementing a data structure for representing a $C_0$-trie, the program instructions comprising:

providing a depth vector having encoded depth values for depths of leaves of an $C_0$-trie, the depth vector being encoded to show whether or not the corresponding leaf is an empty leaf node and being of arbitrary length;

providing a set of selector vectors, grouped in a compound vector, each selector vector corresponding to a level of the $C_0$-trie, each selector vector being a vector used to select entries of the depth vector and the number of selector vectors in the set of selector vectors being arbitrary; and providing a set of counter vectors, grouped in a compound vector, each selector vector having paired therewith a corresponding counter vector, the counter vector being a vector whose length is equal to the number of 1-bits in the corresponding selector vector.

18. The computer program product of claim 17, wherein for any level 1 subtrie A of the $C_0$-trie, and its level 1 predecessor B, the depths of all the level 1-1 subtries of A are greater than the depths of A and B; and wherein values or strings in the $C_0$-trie are distinguished by the shortest possible prefixes by having no empty nodes included in the leaves of the subtries.

19. A computer program product embodying computer program instructions for implementing a $C_0$-trie search process, the program instructions comprising:

for each subtrie in a next level beneath a top search level, searching depths of the top-1 search level subtries;

examining depth values selected by the top-1 search level selector vector;

if the value is not identified as being part of the current top-1 search level subtrie, determining if there are any remaining top-1 level subtries to search;

if there are not any remaining top-1 level subtries to search, terminating the process and if there are more top-1 level subtries to search, continuing searching the remaining top-1 level subtries;

when a top-1 search level subtrie including the searched for value is identified, descending the process one level by making the current top-1 search level the top search level and the identified top-1 search level subtrie an identified top search level subtrie; and determining if a new top search level is a leaf selector level and if not, continuing searching the top-1 search level subtries of the identified top search level subtrie.

20. A computer program product embodying computer program instructions for implementing a $C_0$-trie delete process, the program instructions comprising:

receiving a list of lexical identifiers to delete;

if the number of lexical identifiers to be deleted exceeds a threshold value, then generating a new $C_0$-trie using remaining lexical identifiers in the $C_0$-trie;

if the number of lexical identifiers to be deleted does not exceed the threshold value then performing the following:

if there are only two levels in the $C_0$-trie then deleting leaves including the lexical identifiers;

if the $C_0$-trie has more than two levels, then performing the following:

traversing a branch of the $C_0$-trie including a lexical identifier to be deleted; and deleting the lexical identifier from the branch of the $C_0$-trie;

if the remaining $C_0$-trie has more than two levels, then examining the $C_0$-trie and merging subtries of the $C_0$-trie.

21. A computer program product embodying computer program instructions for implementing a $C_0$-trie insert process, the program instructions comprising:

receiving values to insert;

if the $C_0$-trie has two levels, then performing the following:

while there are values to insert, iteratively performing the following:

identifying a key interval in an existing leaf of the $C_0$-trie to which a value belongs; and inserting one or more value into the identified key interval;

splitting a subtrie of the $C_0$-trie if the subtrie includes new values that have a depth less than or equal to the depth of the subtrie.

22. The computer program product of claim 21, the instructions further comprising:

if the $C_0$-trie has more than two levels, then performing the following:

while there are values to insert, iteratively performing the following:

while a selected level immediately below a current level is not a level above a leaf level, recursively determining which level immediately below the current level includes a subtrie of the $C_0$-trie whose key interval includes a value and selecting the determined subtrie;

identifying a key interval in an existing leaf of the $C_0$-trie to which a value belongs; and inserting one or more values into the identified key interval;

splitting the subtrie if the subtrie includes new values that have a depth less than or equal to the depth of the subtrie.

23. A data processing system for implementing a compact 0-complete binary tree, comprising:

means for providing a depth vector having encoded depth values for depths of leaves of a 0-complete binary tree, the depth vector being encoded to show whether or not the corresponding leaf is an empty leaf node and being of arbitrary length;

means for providing a set of selector vectors, grouped in a compound vector, each selector vector corresponding to a level of the compact 0-complete binary tree, each selector vector being a vector used to select entries of the depth vector and the number of selector vectors in the set of selector vectors being arbitrary; and means for providing a set of counter vectors, grouped in a compound vector, each selector vector having paired therewith a corresponding counter vector, the counter vector being a vector whose length is equal to the number of 1-bits in the corresponding selector vector.

24. The data processing system of claim 23, wherein for any level 1 subtrie A of the $C_0$-trie, and the level 1 subtrie A's level 1 predecessor B, the depths of all the level l-1 subtries of A are greater than the depths of A and B; and wherein values or strings in the $C_0$-trie are distinguished by the shortest possible prefixes having no empty nodes included in the leaves of the subtries.

* * * * *